(12) United States Patent
Arai

(10) Patent No.: US 7,417,762 B2
(45) Date of Patent: Aug. 26, 2008

(54) METHOD FOR FORMING COLOR CONVERSION TABLE, APPARATUS FOR FORMING COLOR CONVERSION TABLE, PROGRAM FOR FORMING COLOR CONVERSION TABLE AND PRINTING APPARATUS

(75) Inventor: Yoshifumi Arai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1112 days.

(21) Appl. No.: 10/233,313

(22) Filed: Aug. 29, 2002

(65) Prior Publication Data

US 2003/0090726 A1 May 15, 2003

(30) Foreign Application Priority Data

Aug. 30, 2001 (JP) ............... 2001-261746

(51) Int. Cl.
*H04N 1/60* (2006.01)
*G09G 5/02* (2006.01)
*G06K 9/00* (2006.01)
*G03F 3/08* (2006.01)

(52) U.S. Cl. .............. 358/1.9; 358/518; 358/523; 345/604; 345/591; 382/167

(58) Field of Classification Search ............. 358/1.9, 358/523, 518; 382/167; 345/170, 172, 591, 345/604

See application file for complete search history.

(56) References Cited

U.S. PATENT DOCUMENTS 6,323,969 B1 * 11/2001 Shimizu et al. ............ 358/523

2003/0193677 A1 * 10/2003 Zeng ..................... 358/1.9

FOREIGN PATENT DOCUMENTS

| JP | 06-237371 | 8/1994 |
|---|---|---|
| JP | 07-288701 | 10/1995 |
| JP | 3153002 | 1/2001 |

OTHER PUBLICATIONS

Abstract of Japanese Patent Publication No. 06-237371, Pub. Date: Aug. 23, 1994, Patent Abstracts of Japan.
Abstract of Japanese Patent Publication No. 07-288701, Pub. Date: Oct. 31, 1995, Patent Abstracts of Japan.
Abstract of Japanese Patent Publication No. 06-022124, Patent Abstracts of Japan, Pub. Date: Jan. 28, 1994.

* cited by examiner

*Primary Examiner*—Mark Zimmerman
*Assistant Examiner*—Thomas J Lett
(74) *Attorney, Agent, or Firm*—Martine Penilla & Gencarella, LLP

(57) ABSTRACT

A method which enables high-accuracy color conversion. On condition that conversion from a second color space into a first color space can be made accurately, target coordinates in the first color space are determined and coordinates in the second color space are arbitrarily determined. The coordinates in the second color space are converted into coordinates in the first color space and the difference between the resulting coordinates and the target coordinates is calculated. A trial for moving the coordinates in the second color space is repeated until the difference becomes smaller than a prescribed threshold. Therefore, the correlation between the first and second color spaces can be defined by repeating only the accurate conversion process so that color conversion can be accurately made over the whole color gamut according to the correlation thus defined.

23 Claims, 12 Drawing Sheets

METHOD FOR FORMING COLOR CONVERSION TABLE, APPARATUS FOR FORMING COLOR CONVERSION TABLE, PROGRAM FOR FORMING COLOR CONVERSION TABLE AND PRINTING APPARATUS

BACKGROUND OF THE INVENTION

1. Field of the Invention

The present invention relates to a method for forming a color conversion table, an apparatus for forming a color conversion table, a program fro forming a color conversion table and a printing apparatus.

2. Description of the Related Art

Image devices such as displays and printers usually produce colors using color image data which express three color components in terms of tone values. For example, they employ a color system such as the RGB color system which uses R (red), G (green), and B (blue) or the CMY color system which uses C (cyan), M (magenta), and Y (yellow). Since these color systems are usually device dependent, an LUT (lookup table) which defines the correspondence or correlation between color systems has been used in order to enable output of the same image with the same colors on different image devices. Such LUTs include ones which define the correlation between the color system of an input image device and that of an output image device, and ones which define the correlation between an output image device's color system and the absolute color space.

In a printing apparatus, usually an LUT must define the correlation by $M^3$ coordinate points (where M denotes the number of grid points per color component). Since it is unrealistic to measure all points using a calorimeter, $N^3$ coordinate points are picked up as sample data to determine $M^3$ coordinate points (M>N). For example, in order to correlate Luv coordinate values with CMY coordinate values, $N^3$ patches printed according to given CMY data are measured with a calorimeter to yield Luv coordinate data, and linear interpolation such as volume interpolation is performed based on the obtained correlation to work out CMY coordinate values which correspond to arbitrary $M^3$ Luv coordinate values.

The above-mentioned conventional color conversion program has the following problem.

Since sample color patches are printed on the above-mentioned printing apparatus, CMY coordinate values of cubic lattice points can be selected in the CMY color system, but a lattice formed by coordinate values in a uniform color space such as Luv color system is generally distorted. In the above volume interpolation calculation, arbitrary coordinates in the cubic lattice can be converted into coordinates in the distorted lattice with high accuracy; however, accurate conversion of arbitrary coordinates in the distorted lattice into coordinates in the cubic lattice requires numerous lattice points and $N^3$ coordinate points as mentioned above are not sufficient for this purpose. Therefore, an LUT thus formed is not accurate enough.

In an actual printing process, coordinate values are worked out by interpolation with coordinate values as defined by the above LUT and thus color conversion is not made accurately. Concretely, it is impossible to avoid a phenomenon that some area in the color space is less accurate than the other area, leading to a tone jump in the printed result. This method does not guarantee a certain level of accuracy for different types of printing apparatuses and the color conversion accuracy may be extremely low in some types of printing apparatuses

SUMMARY OF THE INVENTION

In view of the above circumstances, the present invention has been made and provides a method for forming a color conversion table, apparatus for forming a color conversion table, program for forming a color conversion table and printing apparatus which enable highly accurate color conversion over the whole gamut of a color space and form a color conversion table with device-independent accuracy.

In order to achieve the above object, according to first aspect of the invention, a method for forming a color conversion table including plural data which, according to the correlation between a first color space and a second color space as defined by a prescribed number of previously acquired sample data, defines the correlation between the first color space and the second color space, comprises the steps of setting, in the first color space, target coordinates with respect to which the correlation is defined; setting, in the second color space, conversion object coordinates (coordinates to be converted); converting the conversion object coordinates into corresponding coordinates in the first color space according to the sample data; carrying out a trial process involving the step of setting conversion object coordinates and the step of converting them so as to decrease the difference between the corresponding coordinates in the first color space as obtained by the conversion step and the target coordinates; and generating color conversion table data which defines the correlation between the conversion object coordinates in the second color space and the target coordinates when the difference becomes smaller than a prescribed threshold.

In this case, as mentioned above, a color conversion table is formed which includes plural data which, according to the correlation between a first color space and a second color space as defined by a prescribed number of previously acquired sample data, defines the correlation between the first color space and the second color space. The data thus generated enables accurate conversion from the first color space into the second color space, where the data is generated in the following sequence on condition that conversion from the second color space into the first one can be made according to the sample data with higher accuracy than when conversion from the first color space into the second one is made.

First, at the step of setting target coordinates, target coordinates with respect to which the color conversion table defines the correlation are set in the first color space, and at the step of setting conversion object coordinates, conversion object coordinates are set in the second color space. At the conversion step, the conversion object coordinates (coordinates to be converted) are converted into corresponding coordinates in the first color space according to the sample data. As stated above, this conversion can be carried out accurately. At the trial step, the step of setting target coordinates and the conversion step are tried repeatedly so as to decrease the difference between the corresponding coordinates in the first color space as obtained by the above conversion step and the target coordinates. Usually, the difference in the first color space is decreased gradually by repeating such a trial. Then, at the step of generating color conversion table data, when the difference becomes smaller than a prescribed threshold, the conversion object coordinates concerned in the second color space are correlated with the target coordinates to generate color conversion table data.

In other words, according to the invention, coordinates in the second color space are converted into coordinates in the first color space and trials are made repeatedly until the difference between the coordinates obtained by the conversion and target coordinates decreases to below a prescribed threshold. When this threshold is set to a sufficiently small value, it may be thought that the coordinates in the second color space after the trial process and those in the first color space represent the same color, and hence the correlation between both the color spaces can be defined with high accuracy by bringing both the coordinates into correspondence with each other. In this case, the amount of difference is directly compared with the prescribed threshold. Alternatively, however, it is also possible that the amount of difference is expressed by a color component along an axis in the first color space and a decision is made as to whether the component is below the prescribed threshold. The correlation between the color spaces can be defined accurately, provided that conversion from the second color space into the first one is made accurately. Even when the difference between the coordinates obtained by conversion and the target coordinates is smaller than the prescribed threshold, if the conversion accuracy should be low, the coordinates in the second color space could not be considered to express the same color as the target coordinates. The coordinates after conversion may happen to be very close to the target ones because of poor accuracy or an error.

In addition, the relation of the second color space against target coordinates can be defined to generate color conversion table data by repeating the above trial without the need for making low-accuracy conversion from the first color space into the second one, namely without the need for converting arbitrary target coordinates with low accuracy. Further, since the trial is made repeatedly so as to bring coordinates in the second color space closer to the target, corresponding coordinates in the second color space can be worked out regardless of the position of the arbitrary target coordinates in the first color space and the arrangement of sample data. Therefore, $M^3$ coordinates necessary for a general LUT can be easily obtained. The coordinates in the second color space are moved by trials step by step, so even if the sample data contains some error, as the color conversion table data already generated by the above process is used, color conversion table data which accurately defines the correlation increases and finally color conversion table data which accurately defines the correlation with every coordinates can be generated.

Regarding color conversion accuracy, the accuracy for conversion from the second color space into the first one should be higher than that for conversion from the first one into the second one. Namely, as far as conversion from the second color space into the first one can be made with high accuracy, the correlation between both the color spaces can be defined more accurately through the above trial process than when the target coordinates are directly converted into coordinates in the second color space. The larger the accuracy difference between the first-to-second color space conversion and the second-to-first color space conversion is, the more advantageous the invention is. The conversion method is not limited but the use of interpolation is likely to produce a larger accuracy difference for the following reason. When a color expressed by coordinates in the second color space is outputted by a given image device and the output color is measured to obtain corresponding coordinates in the first color space, the correlation concerned becomes sample data but the color outputted by the image device can be easily controlled.

Therefore, when the color of coordinates which make up a cubic lattice in the second color space is outputted, the corresponding color coordinates in the first color space usually do not make up a cubic lattice, and coordinates in the cubic lattice can be converted into coordinates in the non-cubic lattice by interpolation very easily, or accurately but doing so vice versa is not easy and usually not accurate. Accordingly, application of the invention ensures that the correlation between the color spaces is defined accurately without making low-accuracy conversion, thereby generating table data for high accuracy color conversion. By contrast, if conversion of coordinates in the non-cubic lattice into coordinates in the cubic lattice is made with low accuracy, the conversion accuracy may fluctuate locally depending on the shape of the non-cubic lattice, which may lead to the conversion accuracy's image device dependency. In the invention, trials are made through high-accuracy conversion so that such fluctuation in color conversion accuracy for generated color conversion table data will not occur and there will be no device-dependency.

At the step of setting target coordinates, coordinates with respect to which color conversion table data is generated should be selected and the target coordinates are arbitrary. Needless to add, effects which are desirable in various aspects may be produced by selecting target coordinates in various ways, as will be stated later. At the step of setting conversion object coordinates, coordinates to be converted should be selected. According to the invention, since the coordinates are moved through the trial process, any coordinates may be selected in the initial trial to make the difference smaller than the desired threshold. Various approaches to increasing the possibility of reducing the difference effectively are possible. Various optimization methods such as the Gauss-Newton method and the gradient search method may be employed to decrease the difference between the target coordinates and the corresponding coordinates in the first color space resulting from several trials. At the step of generating color conversion table data, a threshold should be specified and the correlation in which the difference is smaller than the threshold should be obtained. Data for a color conversion table can be thus generated from plural correlation data.

According to second aspect of the invention, a method for forming a color conversion table including plural data which, according to the correlation between a first color space and a second color space as defined by a prescribed number of previously acquired sample data, defines the correlation between the first color space and the second color space, with the sample data making up a virtually cubic lattice in the second color space and the corresponding lattice points in the first color space making up a non-cube, comprises: a step of setting, in the first color space, target coordinates with respect to which the correlation is defined; a step of setting, in the second color space, coordinates to be converted; a step of converting the conversion object coordinates into corresponding coordinates in the first color space according to the sample data; a step of carrying out a trial process involving the step of setting conversion object coordinates and the step of converting them so as to decrease the difference between the corresponding coordinates in the first color space as obtained by the conversion step and the target coordinates; and a step of generating color conversion table data which defines the correlation between the conversion object coordinates in the second color space and the target coordinates when the difference becomes smaller than a prescribed threshold at the trial step.

This means that since the color of coordinates in the second color space is brought closer to the color of target coordinates until they are considered equal, and the correlation concerned is defined as color conversion table data, this method may be applied to different situations. According to the invention, in a situation that the above sample data represent lattice points making up a virtually cubic lattice in the second color space and corresponding lattice points in the first color space make up a non-cubic lattice, the steps of setting target coordinates, setting conversion object coordinates, performing conversion, making trials, and generating color conversion table data are carried out. In this situation, generally, getting coordinates in the non-cubic lattice from coordinates in the virtually cubic lattice by interpolation, etc. can be done easily and accurately. Thus, table data which enables highly accurate color conversion can be generated in this situation. Here, it is sufficient that the lattice points make up a virtually cubic lattice or coordinate points of sample data are almost at the apex of a cube, i.e. the lattice need not be perfectly cubic. For other situations, various approaches, configurations or methods may be adopted as discussed above.

According to third aspect of the invention, a method for forming a color conversion table forms a color conversion table including plural data which, according to the correlation between a first color space and a second color space as defined by a prescribed number of previously acquired sample data, defines the correlation between desired coordinates in the first color space and coordinates in the second color space, wherein the step of converting coordinates in the second color space into coordinates in the first color space according to the previously defined correlation can be carried out; coordinates in the first color space corresponding to the coordinates in the second color space are calculated by the conversion step; and the difference between the calculated coordinates and the coordinates in the first color space is fed back; then the process of setting next coordinates in the second color space is repeated to find coordinates in the second color space which correspond to the desired coordinates in the first color space and make it the color conversion table data. Here, the technique of bringing the color of coordinates in the second color space closer to the color of target coordinates by the trial process to define the correlation between the color spaces may be adopted in different situations for generation of color conversion table data.

As explained above, the invention can be embodied for different situations.

According to fourth aspect of the invention, the first color space is a uniform color space and the second color space consists of components corresponding to three colors to be used in an image device. Here, it is necessary to evaluate the amount of difference in the first color space between the target coordinates and the corresponding coordinates obtained by conversion in the trial process and the distance difference corresponds to the color difference in the uniform color space and thus evaluation of the difference in the first color space is equivalent to evaluation of the color difference. Consequently, this method is suitable for deciding whether the same color can be attained as a result of the trial process. Concrete forms of uniform color space include Luv color spaces and Lab color spaces. Also, when the second color space is a color space consisting of specific three colors as used in an image device, color conversion table data which can be directly used in the image device can be generated. Also, color conversion table data which takes the image device's device-dependency into consideration can be generated.

According to fifth aspect of the invention, the second color space consists of components corresponding to three colors to be used in an image device, and sample data which defines the correlation between the first color space and the second color space is obtained by measuring the colors outputted by the image device with a prescribed calorimeter. Here, accurate sample data can be obtained by measuring the color outputted by the image device. Also, since color image data to be dealt with by the image device is expressed by coordinates in the second color space, coordinates in the second color space as desired by the user may be used as sample data. Although the number of sample data is smaller than the number of color conversion table data, there should be as many sample data as necessary to enable accurate conversion almost over the whole color gamut of the image device and $10^3$ sample data or so may be realistic. Because the color space composed of three colors as used in the image device is expressed by a three-dimensional space with mutually orthogonal axes representing the three colors, preferably each axis should be equally divided to make a cubic lattice. In this sense, the desirable number of sample data is $X^3$ (X represents the number of segments of each axis plus 1).

According to sixth aspect of the invention, the step of setting target coordinates is as follows. At the step of setting target coordinates, coordinates in a third color space are converted into coordinates in the first color space in accordance with a prescribed formula and the resulting coordinates are treated as target coordinates. Although any coordinates in the first color space may be used as target coordinates, from the viewpoint of generation of color conversion table data, it may be more convenient to select target coordinates in accordance with prescribed guidelines. If coordinates in the first color space can be calculated from coordinates in the third color space in accordance with a prescribed formula, a color conversion table which defines the correlation between the third and second color spaces can be generated from a table which defines the correlation between the first and second color spaces by converting coordinates in the third color space into target coordinates.

According to seventh aspect of the invention, for obtaining target coordinates from coordinates in the third color space, it is particularly preferable that the third color space consists of components corresponding to three colors to be used in an image device. In this case, the color outputted by the image device which uses the third color space is correlated with coordinates in the first color space and further with coordinates in the second color space so that, when another image device uses the second color space, a color conversion table which defines the correlation in color between both the image devices can be created. Here, when lattice points which make up a virtually cubic lattice in the third color space are selected and target coordinates are obtained by conversion of these lattice points, the data in the color conversion table represents a virtually cubic lattice. In an image device which uses colors given in the third color space as image data, when coordinates in the third color space are selected so as to cover the whole color gamut of the device, the resulting color conversion table data will cover the whole gamut of the device. Among various examples of the third color space are sRGB color spaces as used by displays and RGB color spaces as used by scanners.

According to eighth aspect of the invention, at the step of setting target coordinates, target coordinates are determined by mapping the coordinates in the first color space obtained by conversion of coordinates in the third color space, in a specified area in the first color space, within the color gamut of the image device which uses the second color space. Since the coordinates in the third color space are converted into coordinates in the first color space in accordance with a formula and the coordinates in the second color space are converted into coordinates in the first color space by the conversion process, the colors in the second color space and those in the third color space can be evaluated within the first color space in accordance with the same guidelines.

Generally the color gamut is different between the image device using the second color space and the one using the third color space. If the color gamut is different, some colors may be reproduced by one device but not by the other. In this case, even when such irreproducible colors are defined by color conversion table data, reference is not made to those colors when using the color conversion table data. If that is the case, color conversion table data for colors which can be reproduced on both the image devices can be defined by gamut mapping. For the purpose of color adjustment, there are many techniques other than the technique of gamut mapping; skin colors and grays which satisfy most users can be reproduced by adjusting coordinate points.

For the trial step, various techniques may be employed in order to decrease the difference to make it smaller than the prescribed threshold.

According to ninth aspect of the invention, in the first trial at the step of setting target coordinates, the same initial coordinates are set for any target coordinates. When coordinates in the second color space are moved at the trial step so as to decrease the difference, there may be a case that the result of calculation of the difference contains a local minimum value and the difference does not appear to decrease even by moving the coordinates in any direction in terms of the formula. Whether or not such a local minimum value is reached may largely depend on the initial coordinates which are converted in the first trial. The difference decreases smoothly with some initial coordinates, but not with others.

If the color of target coordinates and the color of corresponding initial coordinates in the second color space considerably differ, it takes time for the difference to become smaller than the prescribed threshold. This suggests that some initial coordinates in the second color space which are selected are suitable and others are not. However, it is troublesome and difficult to select ideal initial coordinates for all the target coordinates individually. Therefore, it is desirable to use the same initial coordinates in the second color space for any target coordinates. Preferably the initial coordinates should be such that their corresponding coordinates in the first color space are not so far from arbitrarily selected target coordinates and are hard to fall into the minimum value locally. Such coordinates can be desirable initial coordinates for most target coordinates.

According to tenth aspect of the invention, regarding one desirable example of initial coordinates, the first color space is almost symmetric with respect to a specific axis and, in the first trial at the step of setting conversion object coordinates, coordinates in the vicinity of the specific axis are chosen as the initial coordinates to be converted. In other words, when the first color space is almost symmetric with respect to a specific axis, the coordinates in the vicinity of the specific axis should be within a certain distance in relation to the arbitrary coordinates in the first color space, which makes it unlikely that coordinates in an area corresponding to the peripheral area of the first color space are chosen as initial coordinates and the trial process is started with a color less similar to the color of the target coordinates. The distance from the arbitrary coordinates to the coordinates in the vicinity of the axis should be within a certain range and the "coordinates in the vicinity of the axis" may be on the axis or around the axis. In this invention, the coordinates are moved step by step and their position need not be so precise. The color space which is almost symmetric with respect to the specific axis may be a color space which is almost symmetric with respect to the L axis such as an Luv space or a Lab space.

According to eleventh aspect of the invention, at the conversion step, conversion object coordinates in the second color space are converted into coordinates in the first color space using a spline interpolation function determined by the sample data. In other words, at the conversion step, any coordinates in the second color space are converted into corresponding coordinates in the first color space using a spline interpolation function and the spline interpolation function makes it possible that conversion from one color space into the other color space take places depending on sample data accurately. The spline interpolation function is designed to allow each of the axes of one color space to vary independently, which is important in terms of conversion accuracy. This means that when the color of a lattice point in the cubic lattice of the second color space is chosen in the sample data, the lattice point next to that point along the same color component axis represents a color as a variation of the same color component only. Therefore, when one color component is varied in the second color space, how the corresponding color component in the first color space changes can be grasped and the spline interpolation function can be determined according to this relation.

In connection with the sample data, if coordinates in the first color space make up a non-cubic lattice, it is very difficult to convert coordinates in the first color space into ones in the second color space. The positional relation between the arbitrary coordinates in the first color space and the sample data cannot be grasped easily and it is hard to determine which sample data should be used for interpolation. In addition, it is substantially impossible to treat only one color as an independent variable because each color component does not vary independently. This kind of situation often occurs with image devices. For example, in a printing apparatus which uses a CMY color space as the second color space, the color of coordinates in the cubic lattice can be easily outputted by varying C, M and Y components in output color image data independently, but the result of measurement of the output color will lead to a distorted lattice, for example, in an Luv color space.

Although the above spline interpolation procedure may be a conversion method which provides currently possible high and it is most desirable to adopt this method, there are various alterative methods. If a more accurate conversion method is developed in the future, it may be adopted to provide a more accurate color conversion table.

In the above trial step, it is advisable to take into account a situation that the color difference does not decrease smoothly.

According to twelfth aspect of the invention, at the trial step, if the difference in the first color space does not become smaller than a prescribed threshold, the trial process is once stopped after a prescribed number of trials made and the conversion method is changed and then the trial process is resumed. In other words, although it is desirable to adopt a conversion method with currently possible highest accuracy, there may occur a problem that because of the method itself the difference does not decrease smoothly. In that case, it is not rare that the method is switched to another method and the difference is decreased smoothly by resuming the trial process.

Needless to say, the conversion method with highest accuracy may be used again in the final stage in order to obtain highly accurate color conversion table data. One such preferred case may be that the spline interpolation method which permits high-accuracy conversion is adopted as a basic conversion method. When spline interpolation is performed with high accuracy, the above-mentioned difficulty in decreasing the difference may occur due to the lattice curvature. This problem can be solved easily by switching to the interpolation method which uses the apex of the cube as a reference point or the triangular pyramid interpolation method.

As another approach to solving the problem, according to thirteenth aspect of the invention, at the trial step, if the difference in the first color space does not become smaller than a prescribed threshold, the trial process is once stopped after a prescribed number of trials made, the initial coordinates to be converted in the first trial are revised and the trial process is resumed. Namely, depending on the position of initial coordinates, the difference may not decrease smoothly and in that case, it may often be decreased by revising the initial coordinates and then resuming the process.

Hence, according to fourteenth aspect of the invention, the first color space is virtually symmetric with respect to a specific axis and at the trial step, after the trial process is once stopped, coordinates which are away from the initial coordinates by a given distance along the specific axis are defined as new initial coordinates and the trial process is resumed. In other words, when the first color space is almost symmetric with respect to the specific axis, it is preferable to select coordinates in the vicinity of the axis as initial coordinates. Even if the difference does not decrease smoothly with the initial coordinates in the vicinity of the axis, the trial process can be resumed by reselecting preferred initial coordinates in the vicinity of the axis which are along the axis but away from it by a given distance.

According to fifteenth aspect of the invention, in a method for forming a color conversion table which generates color conversion table data where: specific CMY coordinates are given; uniform color space coordinates are obtained as data in a uniform color space such as an Luv color space by measuring color samples outputted by a printing apparatus with a colorimeter; and plural sample data which define the correlation between the CMY color space and the uniform color space using the uniform color space coordinates and the CMY coordinates are given, the color conversion table including plural data defining the correlation between the RGB color space to be used by a display and the CMY color space according to the sample data.

The method comprises: a step of setting corresponding uniform color space coordinates by converting plural coordinates making up a virtually cubic lattice in the RGB color space in accordance with a prescribed formula; a step of setting initial CMY coordinates in the CMY color space; a step of converting the initial CMY coordinates into uniform color space coordinates by interpolation according to the correlation defined by the sample data; a step of calculating the difference between the uniform color space coordinates obtained by the step of converting initial CMY coordinates and the target uniform color space coordinates; a step of repeating a trial in which the CMY coordinates are determined so as to decrease the difference in the uniform color space and the CMY coordinates thus determined are again converted into uniform color space coordinates by interpolation as mentioned above and the difference is calculated again; and a step of generating color conversion table data for converting image data expressed by the RGB color space to be used by the display, into image data expressed by a CMY color space to be used on a printing apparatus, by correlating the CMY coordinates when the difference becomes smaller than a prescribed threshold at the trial step, with the target uniform color space coordinates and correlating the RGB coordinates as the source of the target coordinates with the CMY coordinates. The invention can be thus applied to create an LUT which defines the correlation between the color gamut of the display and that of the printing apparatus.

In sixteenth aspect, as explained above, the method for generating color conversion table data by repeating the trial process of converting coordinates in the second color space and bringing them close to target coordinates in the first color space can be embodied in an actual apparatus. Hence, it can be easily understood that the invention may be applied in the form of an actual apparatus. Also, the methods as described in aspects 4 to 14 may be embodied in an actual apparatus. These methods for forming a color conversion table may be implemented independently or incorporated in an apparatus and implemented in combination with another method. The invention may be embodied in other various forms without departing from its spirit and scope, whether it is software or hardware.

In seventeenth aspect, when the invention is embodied as software for forming a color conversion table, it is apparent that it exists on a recoding medium on which such software is recorded and is used as such. Therefore, the invention may also be embodied as a program for forming a color conversion table. There may also be programs which embody the methods described in aspects 4 to 14. A recoding medium which stores such a program may be a magnetic medium or magnetic optical medium or any other medium which will be developed in the future. The same goes for all levels of copies of such a program including primary copies and secondary copies.

Likewise, the invention may also be applied when a communication network is used to supply data. The concept of the invention may be embodied, whether it is partially in the form of software or hardware. It may be partially stored on a recording medium and read as necessary. All the functions provided by the invention need not be implemented by the program and some of the functions may be implemented by an external program. In that case, a computer may perform the functions. A printing apparatus which carries out color conversion using a color conversion table formed according to the invention falls within the scope of the invention.

BRIEF DESCRIPTION OF THE DRAWINGS

The invention will be more particularly described with reference to the accompanying drawings, in which.

DETAILED DESCRIPTION OF THE PREFERRED EMBODIMENTS

Figure 1:
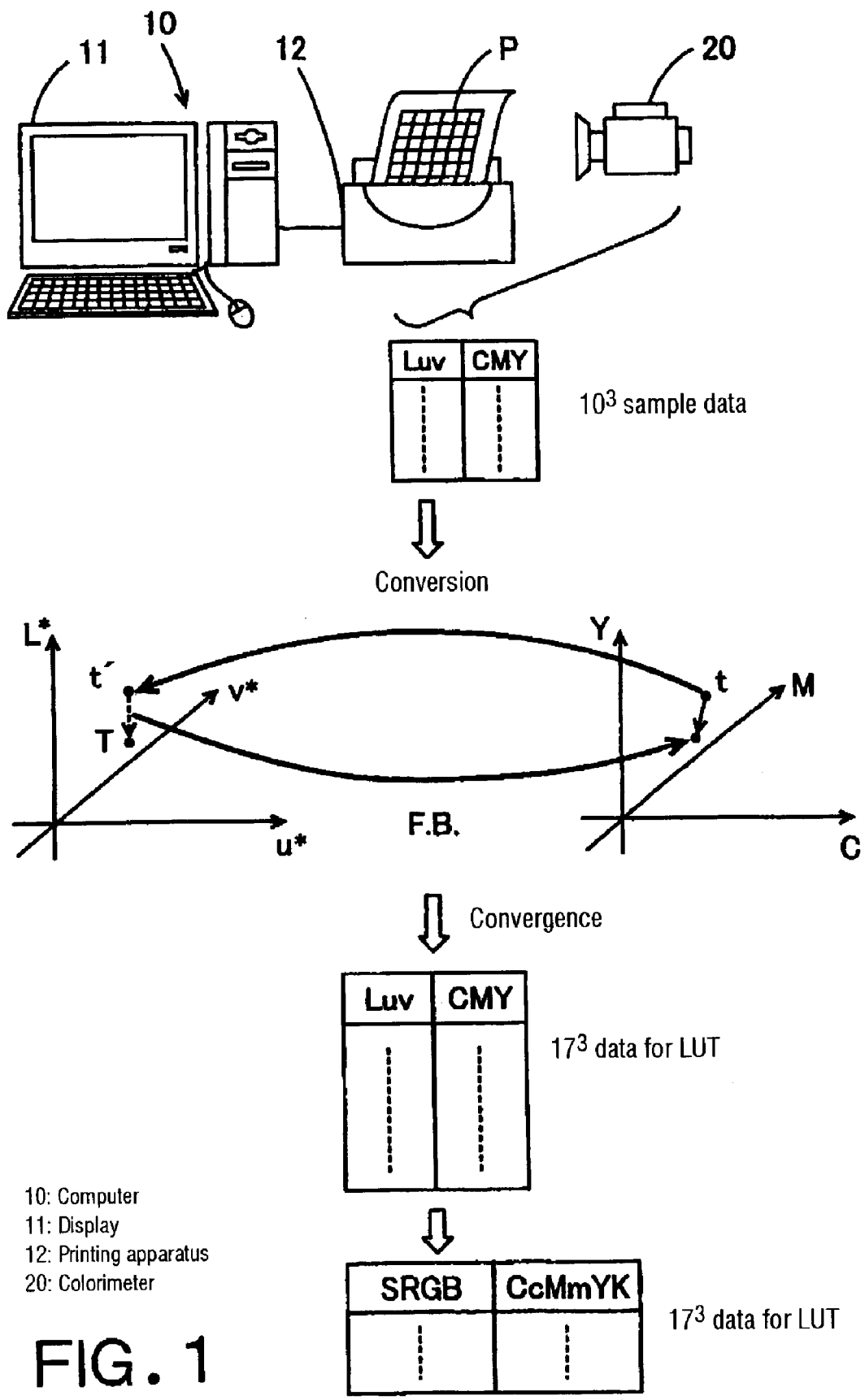
FIG. 1 is an explanatory diagram outlining the color conversion table forming process.
Figure 2:
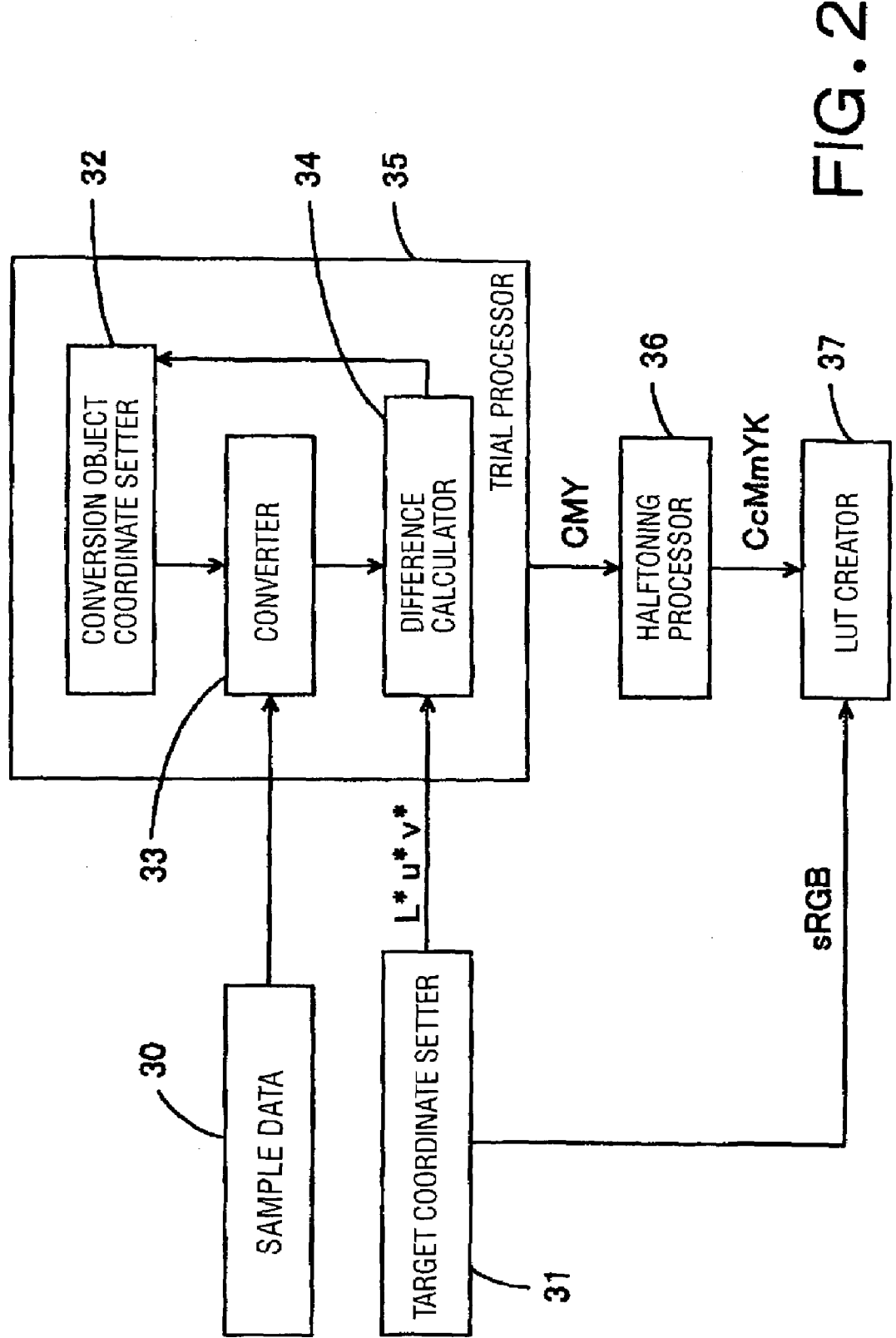
FIG. 2 is a block diagram showing the relationship among various steps in the color conversion table forming process.

Next, preferred embodiments of the invention will be described in the following order:
(1) Structure of the invention
(2) Generating sample data
(3) Determining target coordinates
(4) Trial process
(5) Revising initial coordinates (6) Forming an LUT
(7) Color conversion based on a formed color conversion table
(8) Other embodiments (1) Structure of the Invention FIG. 1 is an explanatory diagram outlining the color conversion table forming process and FIG. 2 is a block diagram showing the relationship among various steps in the process. Referring to FIG. 1, a computer 10 may be a general-purpose personal computer which is connected with a display 11 and a printing apparatus 12. In this embodiment, the correlation between the CMY color space used by the printing apparatus 12 and the Luv color space as a uniform color space is defined and also the sRGB color space used by the display 11 is correlated with the CMY color space. In other words, according to this embodiment, the first color space is a Lab color space, the second one a CMY color space, and the third one an sRGB color space. The printing apparatus 12 is a 6-color printer which uses black (K), light cyan (c), and light magenta (m) inks in addition to CMY inks and generates a color conversion table which defines the correlation between the sRGB space and CcMmYK space using $17^3$ reference points.

In the computer 10, a desired color is represented by giving data on 256 tones of each of C, M and Y colors for pixels in a dot matrix so that a color image is printed on the printing apparatus 12. In this embodiment, $10^3$ sample data 30 is obtained by measuring color patches actually printed on the printing apparatus 12. This sample data 30 brings the CMY color space used by the printing apparatus 12 into correspondence with the Luv color space as a uniform color space. In this embodiment, a target coordinate setter 31 gives specific target coordinates T in the Luv color space and a trial processor 35 makes trials repeatedly until the color expressed by coordinates in the CMY color space is considered equal to the color expressed by target coordinates T in the Lub color space.

In other words, in a conversion object coordinate setter 32, specific conversion object coordinates t in the CMY color space is given; then in a converter 33, the conversion object coordinates t are converted into Luv coordinates t' according to sample data 30; and then in a difference calculator 34, the difference between target coordinates T and Luv coordinates t' is evaluated. The trial processor 35 moves the conversion target coordinates t in the direction which decreases this difference and the above conversion and difference calculation steps are repeated until the difference becomes negligible. At this moment, the conversion object coordinates t and target coordinates T may be considered to represent the same color and the correspondence between both the coordinates is registered in a color conversion table. In the trial processor 35, these trial and data registration steps are repeated $17^3$ times to produce $17^3$ kinds of correspondence data to generate an LUT which defines the correlation between the Luv color space and CMY color space.

The CMY coordinates in the generated LUT may be univocally correlated with the coordinates in the CcMmYK color space and a halftoning processor 36 converts the CMY coordinates in the LUT into CcMmYK coordinates. The target coordinates T in the Luv color space is generated beforehand from the cubic lattice coordinates in the sRGB color space in accordance with a known formula. The target coordinate setter 31 converts the Luv coordinates in the generated LUT into sRGB coordinates. This means that an LUT which correlates sRGB with CcMmYK coordinates can be easily created from the LUT which correlates the Luv coordinates with the CMY coordinates. In an LUT creator 37, an LUT composed of $17^3$ data which correlate the SRGB color space with the CcMmYK color space is created.

The LUT thus created accurately defines the color correlations over the whole color gamut of the display 11 and that of the printing apparatus 12 and its effect is not influenced by the type of printing apparatus 12. Hence, the use of this LUT permits highly accurate color conversion over the whole color gamut and the invention allows any type of printing apparatus 12 to create an LUT with high accuracy. In this embodiment, because the printing apparatus 12 is a 6-color printer, the half toning process is included. However, this halftoning step may be changed to one for a 4-color printer or omitted. Also, the step of correlation with the sRGB color space is not indispensable but instead the step of correlation with an RGB color space proper to a device being used such as a scanner may be included, or for the sake of versatility the LUT may define the correlation between the Luv color space and the CMY color space.

Figure 3:
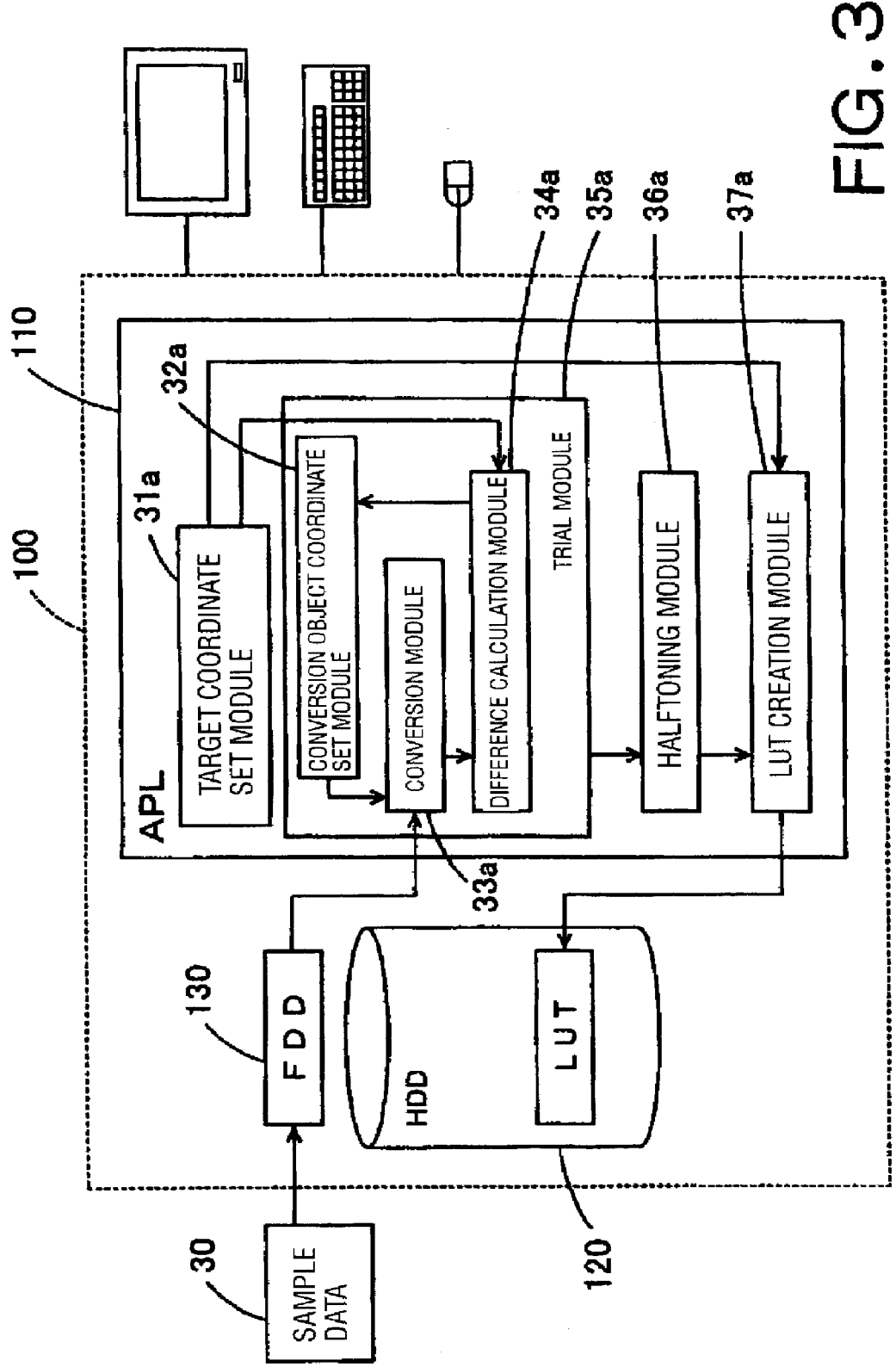
FIG. 3 is a block diagram showing the structure of an apparatus for forming a color conversion table.

The method for forming a color conversion table according to the invention includes many and repeated calculations to define the correlation between the first color space and the second color space. For this reason, it is desirable to use a computer to implement the method. In that case, the computer constitutes an apparatus for forming a conversion table and the program to be executed therein is considered a program for forming a color conversion table. FIG. 3 is a block diagram showing the structure of an apparatus for forming a color conversion table. In the figure, a computer 100 may be a general-purpose personal computer or the like and APL 110, which runs on the computer 100, is a program for forming a color conversion table.

The computer 100 is equipped with a flexible disk drive (FDD) 130 and a hard disk drive (HDD) 120 as well as user interface devices such as a display and a keyboard and runs APL 110 under its operating system (not shown). APL 110 is composed of plural programs in the form of modules which represent the various components shown in FIG. 2. The sample data 30 is read into FDD 130 through a flexible disk (not shown) and fed to a conversion module 33a. A target coordinate set module 31a converts $17^3$ cubic lattice points in the sRGB color space into Luv coordinates in accordance with a prescribed formula.

A conversion object coordinate set module 32a selects initial coordinates in the CMY color space, or coordinates to be converted, in accordance with guidelines as stated later and the conversion module 33a converts the initial (conversion object) coordinates into Luv coordinates. A difference calculation module 34a calculates the difference between the target coordinates selected by the target coordinate set module 31a and the Luv coordinates resulting from the conversion by the conversion module 33a, and a trial module 35a repeats the process from selection of conversion object coordinates through conversion into Luv coordinates to difference calculation until the difference is below a prescribed threshold; then, sends the final CMY coordinates and Luv coordinates to a halftoning module 36a.

The halftoning module 36a converts CMY coordinates into CcMmYK coordinates and an LUT creation module 37a acquires the sRGB coordinates as the source coordinates for the Luv coordinates generated by the target coordinate set module, and creates an LUT. The created LUT is stored in the HDD 120. This LUT is read through the FDD 130 or a network (not shown) to another computer and the printer driver of the computer loads it for use. In this way, the invention may be embodied as an apparatus for forming a color conversion table or a program for forming a color conversion table.

(2) Generating Sample Data

Figure 4:
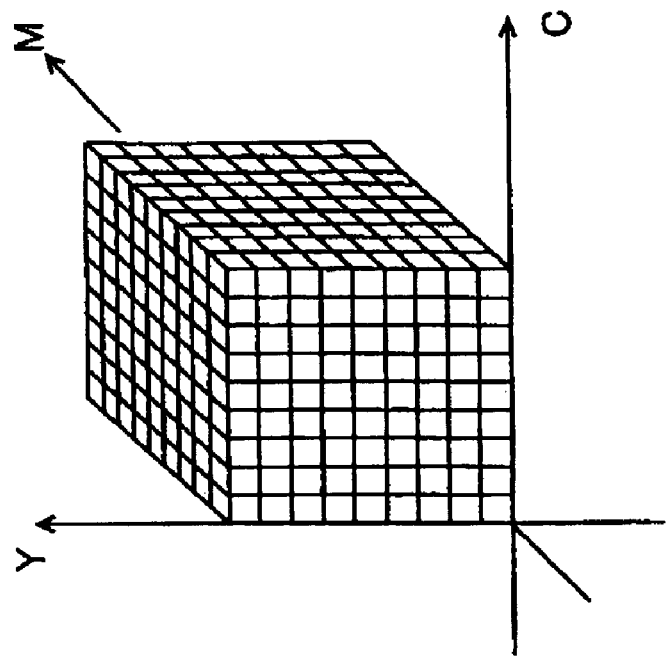
FIG. 4 illustrates how sample data is generated.
Figure 4:
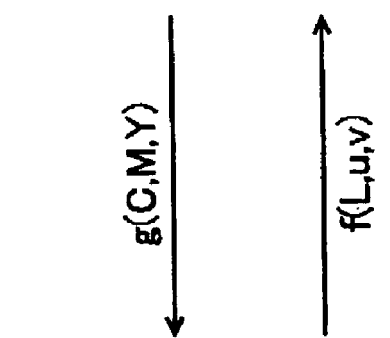
Figure 4:
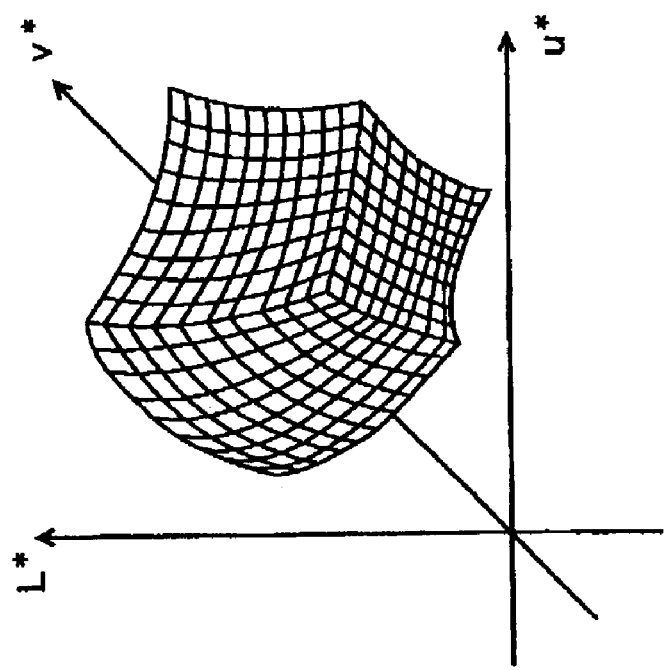

Next, the various steps used in the method for forming a color conversion table will be described in detail. FIG. 4 illustrates how sample data 30 is generated. The sample data 30 is obtained by measuring color patches printed by the printing apparatus 12. It correlates CMY coordinates with Luv coordinates. For the converter to convert CMY coordinates into Luv coordinates with high accuracy, prescribed data is used in printing color patches. As shown in FIG. 4, the computer 10 of FIG. 1 equally divides each of C, M and Y color components into nine segments in a way that ten tone values are given at regular intervals along each axis in the CMY color space and through a combination of these, the printing apparatus 12 prints color patches P according to color image data for $10^3$ colors. Therefore, each color image data corresponds to a cubic lattice in the CMY color space as shown in FIG. 4.

The calorimeter 20 accurately measures color patches P to obtain Luv coordinates. Through this color measurement, $10^3$ kinds of sample data which precisely define the correlation between CMY coordinates and Luv coordinates for color patches can be obtained. While coordinates which express color patches are a cubic lattice in the CMY color space, it is a distorted lattice in the Luv color space, as illustrated in FIG. 4. Therefore, a conversion from a CMY color space into an Luv color space can be done accurately by making a spline interpolation calculation for arbitrary coordinates using the sample data 30, but it is virtually impossible to make a conversion the other way around.

The reason is as follows. A function for spline interpolation is calculated as a function which enables independent variation on each of the C, M, and Y axes. If sample data represents a cubic lattice, movement of a point parallel to each axis is equivalent to movement of only one component with the other two components fixed and thus a spline interpolation function can be easily and accurately calculated. However, in making a conversion the other way around, it is virtually impossible to know how the CMY components vary when only one component in the Luv color space is varied. Referring to FIG. 4, therefore, function g (C, M, Y) which calculates Luv coordinates from CMY coordinates can be worked out correctly while it is virtually impossible to correctly work out function f (L, u, v) which calculates CMY coordinates from Lub coordinates. According to the invention, it is easy to print a color which corresponds to the apex of the cubic lattice in the CMY color space; thus the invention should be implemented on condition that a conversion from a CMY color space into an Luv color space can be correctly made.

(3) Setting Target Coordinates

Figure 5:
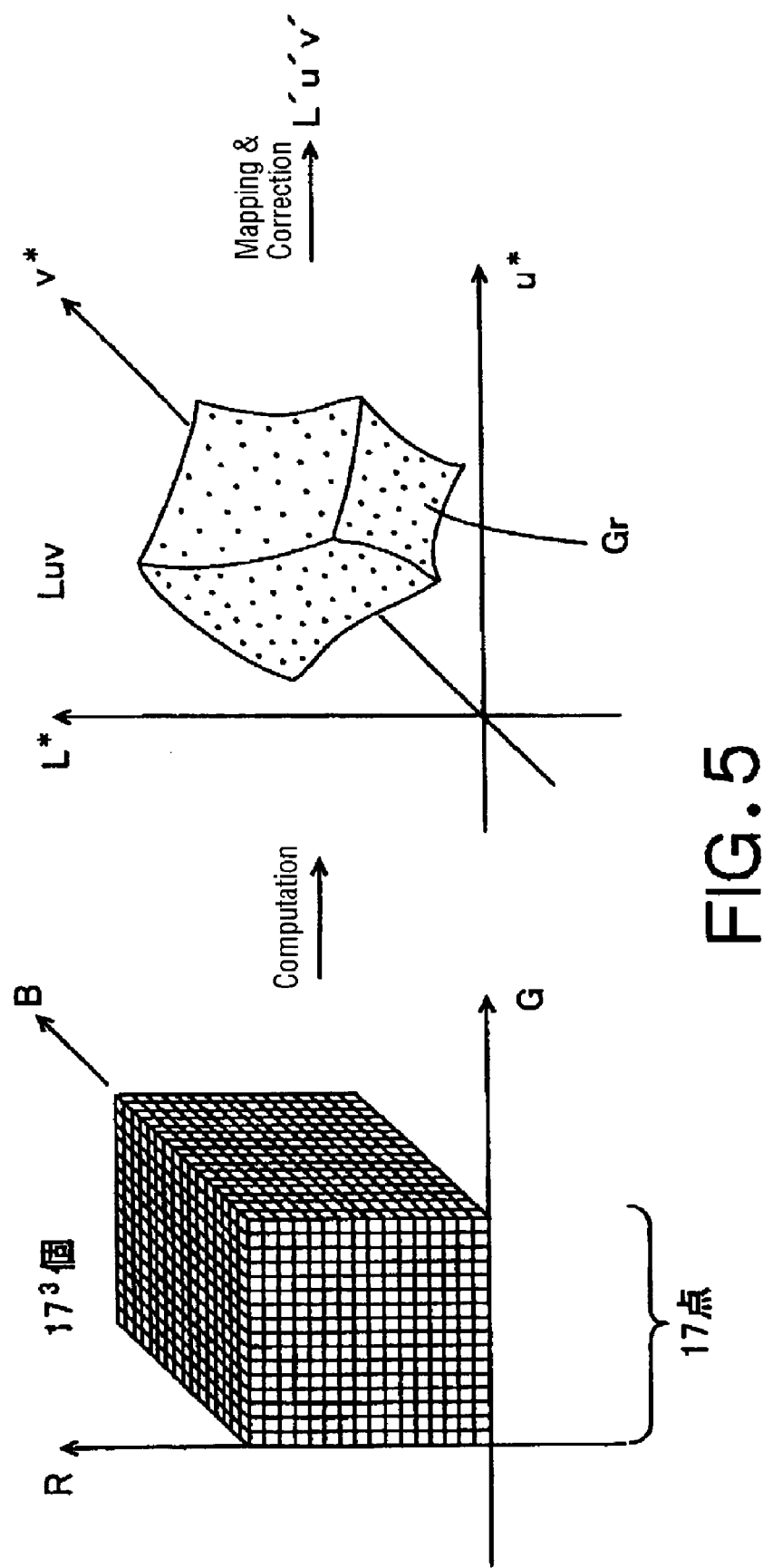
FIG. 5 illustrates how target coordinates are determined.

FIG. 5 illustrates how target coordinates are determined by the target coordinate setter 32. Although target coordinates T may be arbitrary, in this embodiment, target coordinates are generated based on sRGB coordinates which are used on the display 11 so that an LUT which defines the correlation between the display 11 and the printing apparatus 12 can be created. In the display 11 which uses the sRGB color space, color image data is created with data on 256 tones for each color and each color can be independently varied. Since it is desirable for the LUT to have reference points evenly distributed within the color gamut of the display 11, 17 tone values are given at regular intervals in the sRGB color space, defining $17^3$ lattice points, as illustrated in FIG. 5.

The conversion from sRGB coordinates into Luv coordinates can be made easily in accordance with a known formula and the above $17^3$ lattice points are converted into a coordinate group Gr in the Luv color space by computation. Through this conversion, sparsely distributed colors over the whole gamut of the display 11 can be assumed from the perspective of the Luv color space. In addition, preferably not only the LUT should have reference points over the whole color gamut of the display 11 but also the reference points should take the color gamut of the printing apparatus 12 into consideration. This is because the color gamut of the display 11 is different from that of the printing apparatus 12 and, if a color is within the color gamut of the display 11 but out of the color gamut of the printing apparatus 12, it cannot be reproduced on the printing apparatus 12.

In order to arrange a compromise between the display and the apparatus, colors out of the gamut of the printing apparatus 12 are mapped into the gamut of the printing apparatus 12. Further, color correction is made to reproduce flesh colors and grays which look desirable to the human eyes. $17^3$ coordinates L' u' v' in the Luv color space thus obtained become target coordinates T. Consequently, the target coordinates T cover all colors which can appear on the display 11 and at the same time represent colors which are reproducible on the printing apparatus 12, and have undergone color correction to produce colors desirable to the human eyes. By finding the exact correlation between the target coordinates T and CMY coordinates, color conversion can be made correctly and an LUT which reflects the color gamut of the printing apparatus 12 can be created.

(4) Trial Process

Figure 6:
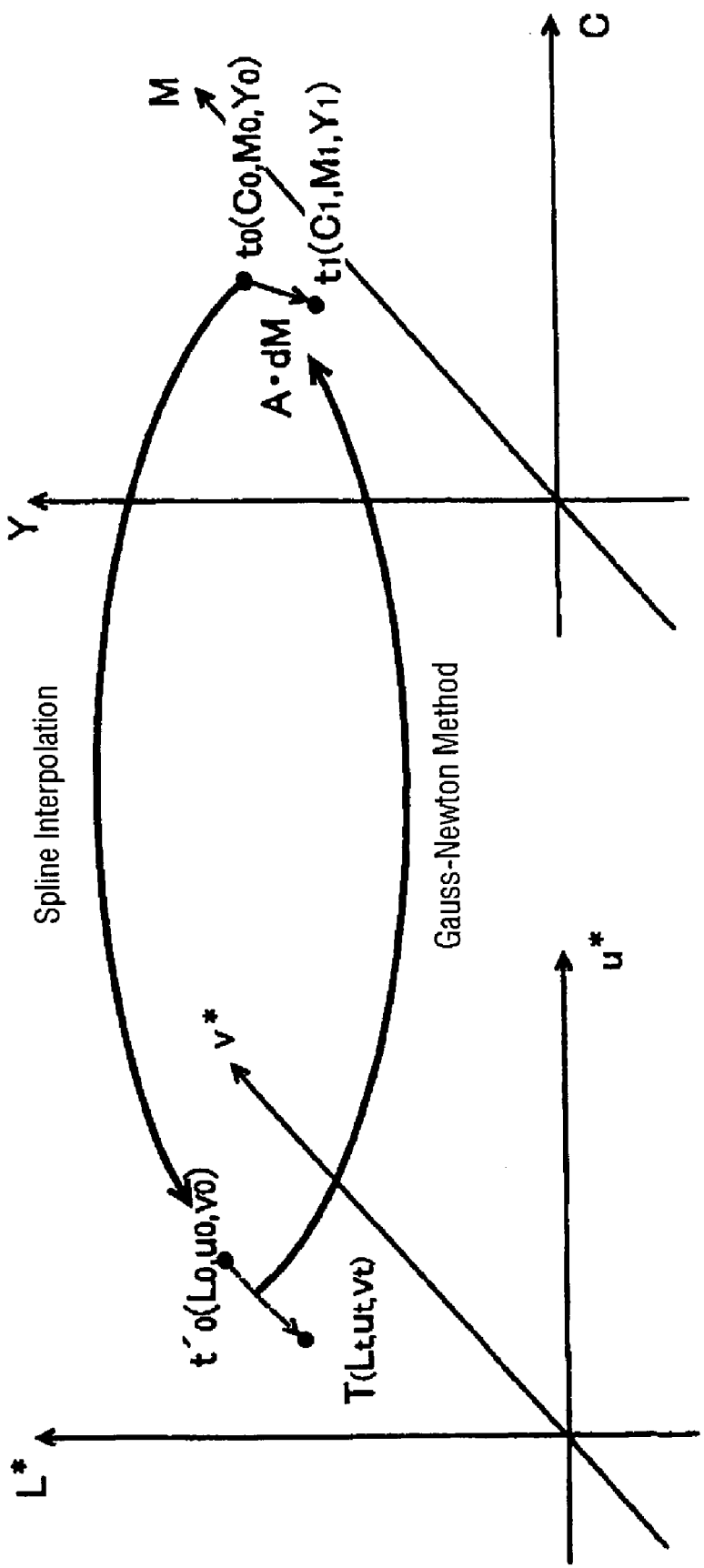
FIG. 6 illustrates how colors of CMY coordinates are converted into colors of Luv coordinates.

FIG. 6 illustrates how the trial processor 35 converges colors of CMY coordinates into colors which can be considered equal to colors of Luv coordinates. In this figure, there are an Luv color space and a CMY color space side by side. In the CMY color space, initial coordinates to as conversion object coordinates and coordinates $t_1$ to be used in the next trial are shown, while in the Luv color space, target coordinates T and coordinates $t'_0$ as a result of conversion of the initial coordinates $t_0$ are shown. The conversion object coordinate setter 32 sets common coordinates $t_0$ ($C_0$, $M_0$, $Y_0$) as the initial coordinates in the first trial for arbitrary target coordinates T. Here the relation of $C_0=M_0=Y_0=\alpha$ exists and a prescribed achromatic color is selected as the color of initial coordinates. In short, if color components $C_0$, $M_0$, $Y_0$ are all equal, the printed color will be almost achromatic though it is device dependent.

Figure 7:
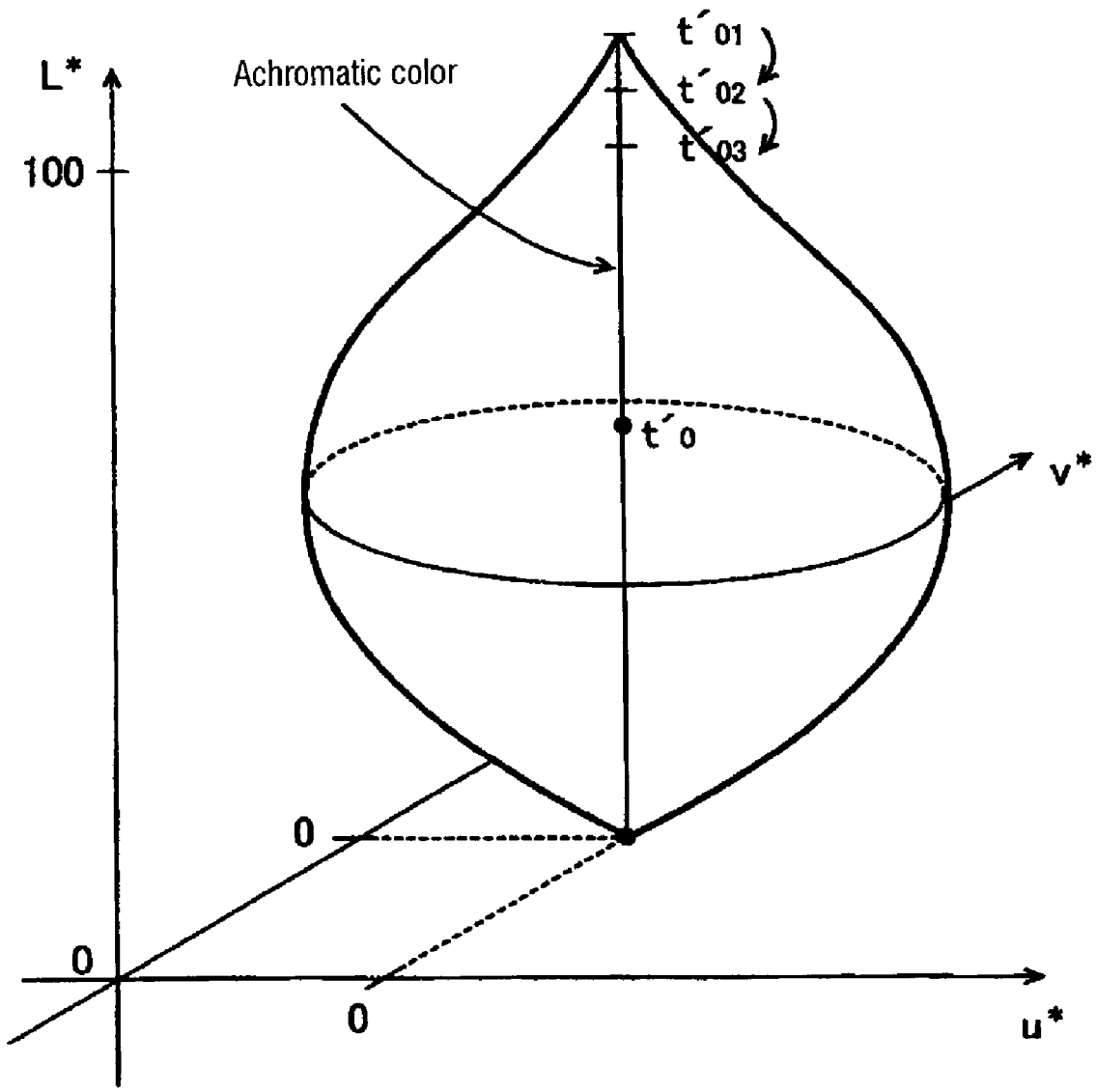
FIG. 7 is a schematic diagram illustrating an Luv color space.

FIG. 7 is a schematic diagram showing the Luv color space. An achromatic color is a color on the L axis in the Luv color space. Accordingly, the coordinates $t'_0$ as the result of conversion of the initial coordinates $t_0$ ($C_0$, $M_0$, $Y_0$) should be in the vicinity of the L axis. The Luv color space is virtually symmetrical with respect to the L axis as shown in the figure and a color on the L axis is not so far away from a coordinate point located in the peripheral area of the Luv color space; thus the coordinates $t'_0$ are suitable as common initial coordinates for all target coordinates T which are sparsely distributed throughout the Luv color space. When the common initial coordinates $t_0$ are used for all target coordinates T, it is unnecessary to revise the initial coordinates in the CMY color space taking the position of individual target coordinates T into consideration and therefore the trial process can be started easily. It is true, however, that when the trial process is started using the initial coordinates to for all target coordinates T, colors can not always be converged successfully. If the amount of color difference cannot be decreased smoothly by trials, namely if the amount of difference does not become smaller than the threshold after a prescribed number of trials, the initial coordinates must be revised before resuming the trial process, as will be stated later.

Once the conversion object coordinate setter 32 has set conversion object coordinates, the converter 33 coverts them into Luv coordinates using the spline interpolation function g (C, M, Y) in accordance with Equation (1) given below:

$$\begin{bmatrix} L \\ u \\ v \end{bmatrix} = g \begin{bmatrix} C \\ M \\ Y \end{bmatrix} \quad (1)$$

Here, the initial coordinates $t_0$ ($C_0$, $M_0$, $Y_0$) are converted into Luv coordinates $t'_0$ ($L_0$, $u_0$, $v_0$). Given next is an explanation of conversion of the initial coordinates, or the first trial. The second and subsequent trials can be made in a similar way.

As the converter 33 converts the initial coordinates to into Luv coordinates $t'_0$, the difference calculator 34 calculates the amount of difference between the given target coordinates T and the Luv coordinates $t'_0$, $\Delta E$, or color difference in accordance with Equation (2) given below:

$$\Delta E = \sqrt{\Delta L^2 + \Delta u^2 + \Delta v^2} \quad (2)$$
$$\Delta L = L_t - L_0$$
$$\Delta u = u_t - u_0$$
$$\Delta v = v_t - v_0$$

In the invention, when this amount of difference $\Delta E$ is smaller than a prescribed threshold $\epsilon$, it is taken that the conversion object coordinates and target coordinates T represent the same color; the trial processor 35 makes several trials to make the color of the conversion object coordinates closer to the color of the target coordinates T. In the early stage of the trial process, usually, since the color difference between the color of target coordinates T and the color of Luv coordinates $t'_0$ obtained by conversion is relatively large, the conversion object coordinates are determined in the next trial so as to get a color closer to the color of the target coordinates T. Here, the conversion object coordinates are moved using the following equation which is in accordance with what we call the "Gauss-Newton method."

First, using Equation (3) given below, partial derivatives for the components $\Delta L$, $\Delta u$, and $\Delta v$ which appear in Equation (2) are calculated. dM which is worked out from Equation (3) indicates a minute variation towards decreasing the amount of difference $\Delta E$.

$$dM = \begin{bmatrix} dL \\ du \\ dv \end{bmatrix} = \begin{bmatrix} \frac{\partial \Delta E}{\partial \Delta L} \\ \frac{\partial \Delta E}{\partial \Delta u} \\ \frac{\partial \Delta E}{\partial \Delta v} \end{bmatrix} = \begin{bmatrix} \frac{\Delta L}{\Delta E} \\ \frac{\Delta u}{\Delta E} \\ \frac{\Delta v}{\Delta E} \end{bmatrix} \quad (3)$$

When the components of arbitrary CMY coordinates are minutely varied, the variation in the Luv color space is expressed as Jacobian matrix J by Equation (4) (below):

$$\begin{bmatrix} dL \\ du \\ dv \end{bmatrix} = J \begin{bmatrix} dC \\ dM \\ dY \end{bmatrix} \quad (4)$$

$$J = \begin{bmatrix} \frac{\partial L}{\partial C} & \frac{\partial L}{\partial M} & \frac{\partial L}{\partial Y} \\ \frac{\partial u}{\partial C} & \frac{\partial u}{\partial M} & \frac{\partial u}{\partial Y} \\ \frac{\partial v}{\partial C} & \frac{\partial v}{\partial M} & \frac{\partial v}{\partial Y} \end{bmatrix}$$

The components of Jacobian matrix J are easily obtained by partially differentiating Luv components with respect to CMY components because the spline interpolation function g (C, M, Y), which is to define the correlation between Luv coordinates and CMY coordinates, is designed as a function whereby each axis (C, M, Y) can be independently varied.

When the components of arbitrary Luv coordinates are minutely varied, the variation in the CMY color space is expressed by Equation (5) (below) as inverse matrix A of Jacobian matrix J:

$$\begin{bmatrix} dC \\ dM \\ dY \end{bmatrix} = A \begin{bmatrix} dL \\ du \\ dv \end{bmatrix} \quad (5)$$

In Equation (5), the right side indicates variation in the CMY color space, so if it is assumed that the difference in each component between coordinates $t_1$ ($C_1$, $M_1$, $Y_1$) and initial coordinates $t_0$ ($C_0$, $M_0$, $Y_0$) is equal to the above variation in the CMY space, Equation (6) is derived.

$$\begin{bmatrix} dC \\ dM \\ dY \end{bmatrix} = \begin{bmatrix} C_1 - C_0 \\ M_1 - M_0 \\ Y_1 - Y_0 \end{bmatrix} \quad (6)$$

Equation (5) is substituted into the right side of Equation (6) and further Equation (3) is substituted and a transposition is made, which leads to Equation (7) (below):

$$\begin{bmatrix} C_1 \\ M_1 \\ Y_1 \end{bmatrix} = \begin{bmatrix} C_0 \\ M_0 \\ Y_0 \end{bmatrix} + A \cdot dM \quad (7)$$

In this case, the first term on the right side expresses the components of the initial coordinates $t_0$; inverse matrix A in the second term on the right side can be calculated because the above Jacobian matrix J can be calculated using the spline interpolation function; and dM in the second term on the right side can be calculated from the differences between the amount of difference $\Delta E$ and Luv components (Equation (3)). Therefore, coordinates $t_1$ ($C_1$, $M_1$, $Y_1$) for the next trial can be calculated by Equation (7) using only the following data: initial coordinates $t_0$, spline interpolation function and target coordinates.

The trial processor 35 makes the conversion object coordinate setter 32 determine the coordinates $t_1$ and the converter 33 convert the coordinates $t_1$ and the difference calculator 34 calculate the amount of difference. These steps are repeated.

Therefore, CMY coordinates $t_0$ and $t_1$ come closer to target coordinates T as more trials are made. In the trial processor 35, when this amount of difference is smaller than a prescribed threshold $\epsilon$, it is taken that the CMY coordinates concerned and target coordinates T represent the same color; the correlation between both the coordinates becomes part of data for a color conversion table.

By making trials in the trial processor 35 in this way, $17^3$ color conversion table data are generated. Steps to create a final LUT are taken using the color conversion table data. Specifically, the halftoning processor 36 converts CMY coordinates for the respective color conversion table data generated by the trial processor 35 into CcMmYK coordinates; then the LUT creator 37 converts Luv coordinates for the respective color conversion table data generated by the trial processor 35 into sRGB coordinates. As a result, an LUT which correlates sRGB coordinates with CcMmYK coordinates through $17^3$ reference points is created.

(5) Revising Initial Coordinates

In the invention, if the difference does not become smaller than the threshold despite the prescribed number of trials made, the initial coordinates are revised and trials are made again. Since, as mentioned above, it is desirable to choose a color in the vicinity of the L axis for initial coordinates, revised initial coordinates should also be in the vicinity of the L axis. Referring to FIG. 7, if the difference is not smoothly decreased using coordinates $t'_0$ in the Luv color space which correspond to common initial coordinates $t_0$, coordinates with all color components "0" in the CMY color space should be initial coordinates. If the difference is not smoothly decreased with the new initial coordinates, the initial coordinates are changed to coordinates with all color components equally incremented by $\Delta\gamma$.

FIG. 7 shows how initial coordinates are changed. Here, the coordinates which correspond to coordinates with all color components "0" in the CMY color space are $t'_{01}$; as the initial coordinates are revised successively, the corresponding coordinates change to $t'_{02}$, $t'_{03}$ and so on along the L axis. By changing the initial coordinates in this way, the difference is smoothly decreased and the color which may be considered equal to the color of target coordinates T is attained during the trial process when specific such coordinates are used as the initial coordinates. Whether coordinates with all color components equal in the CMY color space represent a perfectly achromatic color or not is unknown. In the invention, however, the initial coordinates are moved in the trial process so that the corresponding coordinates come closer to target coordinates T and therefore the coordinates corresponding to the initial coordinates need not be exactly on the L axis.

(6) Forming an LUT

Figure 8:
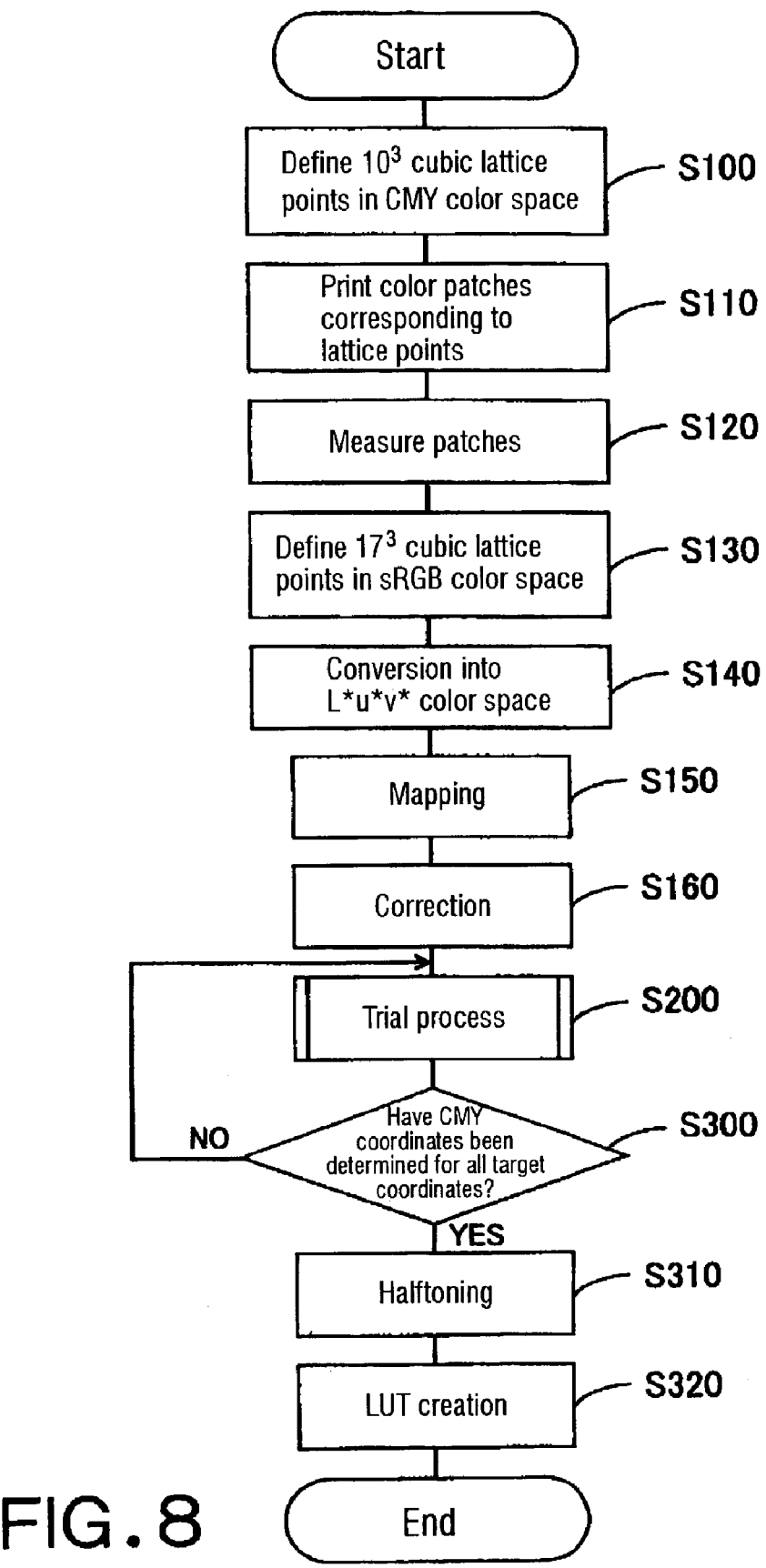
FIG. 8 is a flow chart showing an entire LUT forming process.

Next, the process of forming an LUT where the above-mentioned various steps are taken will be explained referring to the flowchart in FIG. 8. FIG. 8 shows the entire LUT forming process. At step S100, the computer 10 defines a cubic lattice which consists of $10^3$ lattice points equally spaced along each axis in the CMY color space, as shown on the right in FIG. 4. At step S110, the printing apparatus 12 is controlled by the computer 10 to print color patches which correspond to the color components of these lattice points as color image data. At step S120, the printed color patches P are measured with the above calorimeter 20 to generate $10^3$ sample data.

At step S130, in order to make target coordinates T, a cubic lattice which consists of $17^3$ lattice points equally spaced along each axis in the sRGB color space used by the display 11 (see FIG. 5) is defined. At step S140, the lattice points are converted into Luv coordinates in accordance with a known formula. At step S150, the Luv coordinates are mapped into the color gamut of the printing apparatus 12. At step S160, correction is made to reproduce desirable flesh colors, grays or similar colors. The Luv coordinates which have been subjected to this correction are target coordinates T.

At step S200, trials are made using the $10^3$ sample data and $17^3$ target coordinates T and CMY coordinates which may be considered to represent the same color as specific target coordinates T are worked out and stored in the buffer (not shown). At step S300, a decision is made as to whether CMY coordinates corresponding to $17^3$ target coordinates T have been-determined at step S200; if not, step S200 is repeated until CMY coordinates corresponding to all target coordinates T are determined. If it is decided that CMY coordinates for all target coordinates T have been determined, a halftoning process is performed at step S300 and a final LUT which defines the correlation between sRGB coordinates and CcMmYK coordinates is created at step S320.

Figure 9:
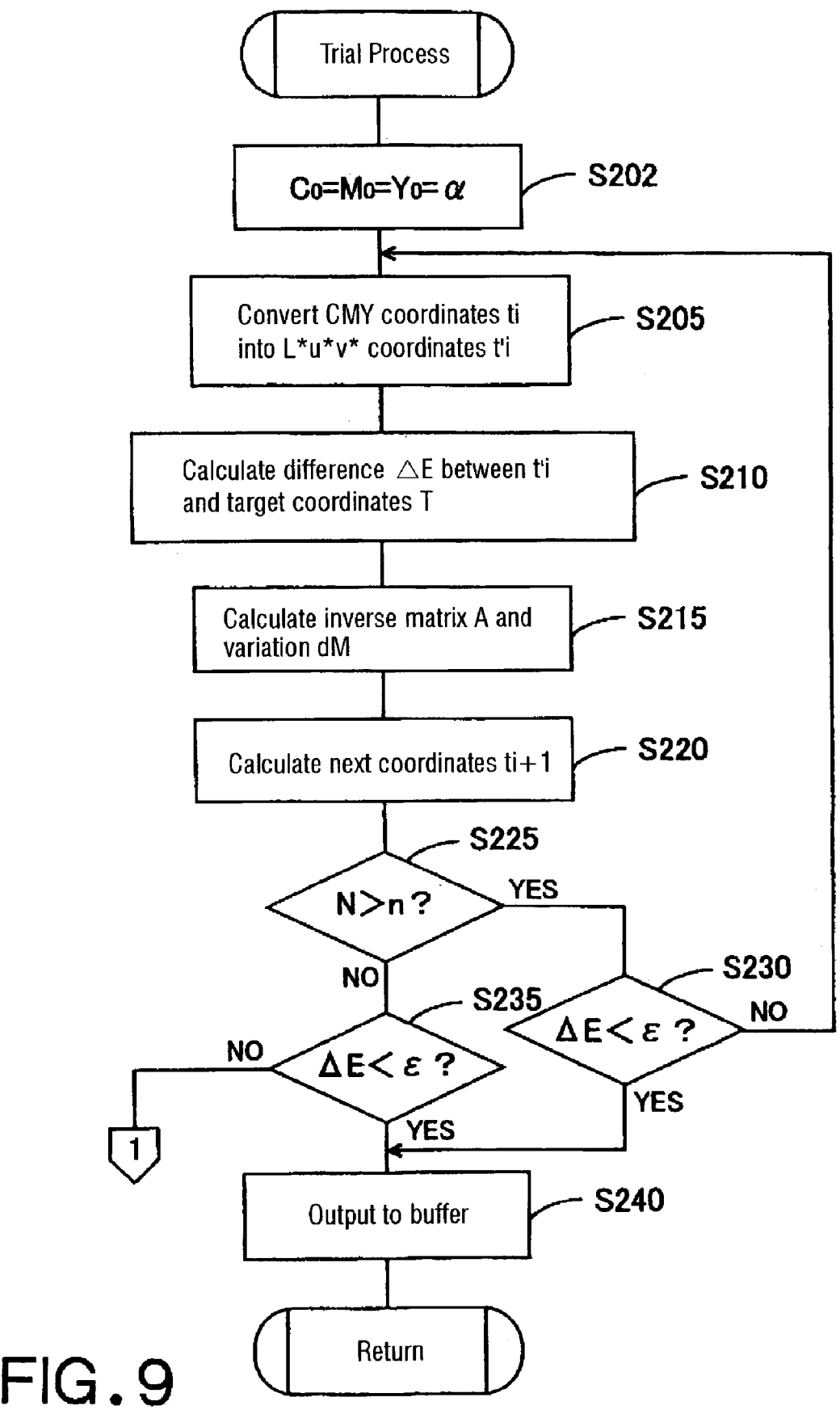
FIG. 9 is a flow chart showing a trial process.
Figure 10:
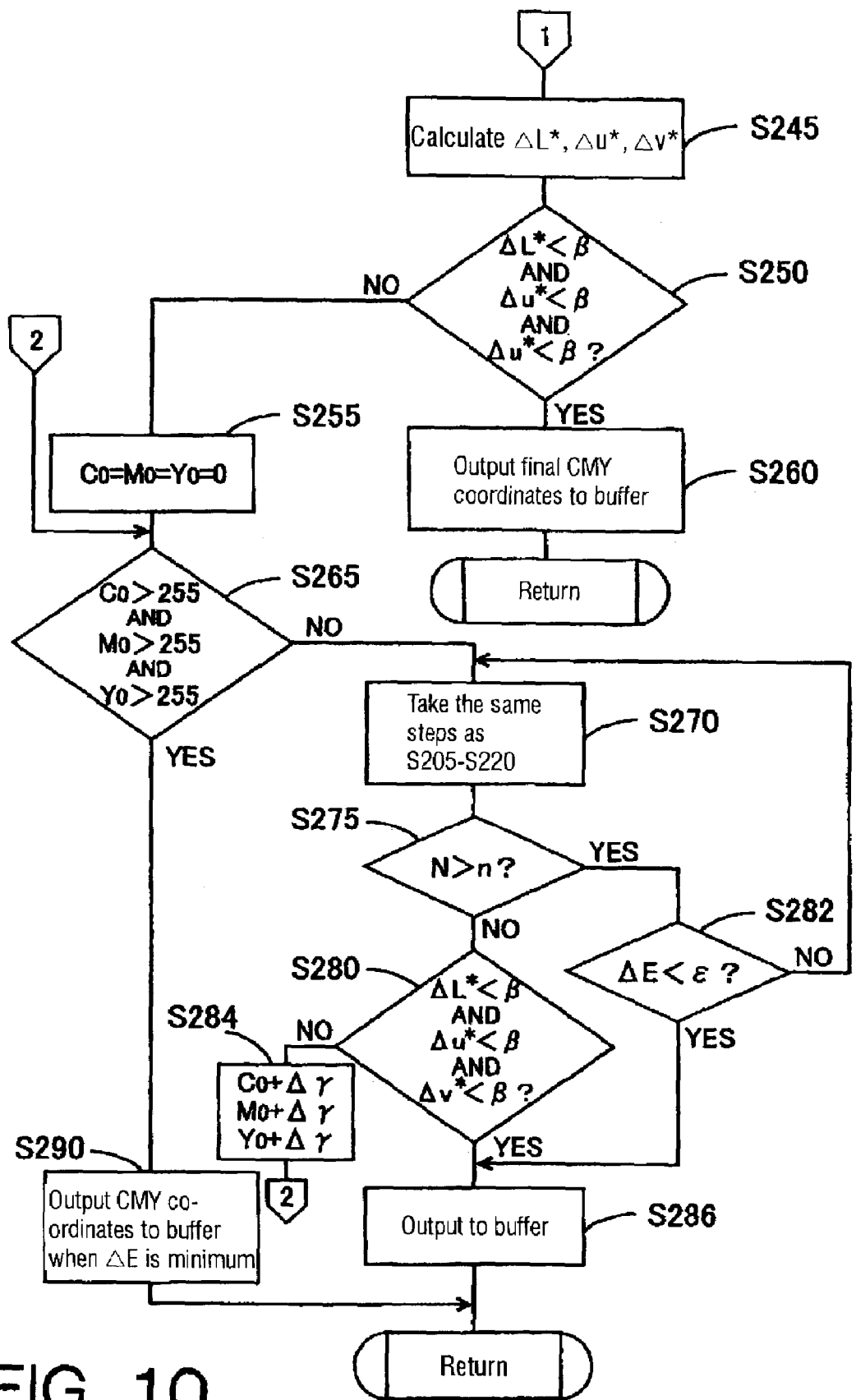
FIG. 10 is a flow chart showing a trial process.

FIGS. 9 and 10 are flow charts concerning the trial process (step S200). At step S202, common initial coordinates for arbitrary target coordinates T are given where all the color components of the initial coordinates in the CMY color space are expressed by $\alpha$. At step S205, CMY coordinates $t_i$ are converted into Luv coordinates $t'_i$ by spline interpolation using Equation (1). Here, i, which represents a positive integer, is "0" for the initial coordinates and incremented by 1 upon each trial. At step S210, the difference between Luv coordinates $t'_i$ (obtained by conversion) and target coordinates T, $\Delta E$, is calculated using Equation (2).

At step S215, inverse matrix A in Equation (5) is calculated using a spline interpolation function; at step S210, the amount of variation in Equation (3), dM, is calculated from the amount of difference $\Delta E$ calculated at step S210 and the components of coordinates obtained by the conversion at step S205. At sep S220, next coordinates $t_{i+1}$ are calculated from the result of the above calculation, using Equation (7). In the invention, the number of trials N is prescribed and count n increments each time a trial (steps from S205 to S220) is made.

At step S225, a decision is made as to whether count n is smaller than N (prescribed number of trials); if it is decided that it is smaller than N, a decision is made as to whether the amount of difference $\Delta E$ is smaller than the prescribed threshold $\epsilon$. If it is not decided at step S230 that $\Delta E$ is smaller than the prescribed threshold $\epsilon$, then the steps from S205 are repeated. If it is decided at step S230 that $\Delta E$ is smaller than the prescribed threshold $\epsilon$, then at step S240 the correlation at that moment between CMY coordinates $t_i$ and target coordinates T is outputted to the buffer.

If it is not decided at step S225 that count n is smaller than N (number of trials), a decision is made at step S235 as to whether the amount of difference $\Delta E$ is smaller than the threshold $\epsilon$. If it is decided at step S235 that $\Delta E$ is smaller than the threshold $\epsilon$, then step S240 (output to the buffer) is carried out. If it is not decided that $\Delta E$ is smaller than the threshold $\epsilon$, it means that trials have been made N times starting with initial coordinates C=M=Y=$\alpha$ but the amount of difference does not become smaller than the threshold $\epsilon$. Therefore, the steps from step S245 as shown in FIG. 10 are started to revise the initial coordinates.

In the steps shown in FIG. 10, threshold $\epsilon$ is less binding. In the invention, threshold $\epsilon$ is highly binding. If CMY coordinates with which the color difference is smaller than this threshold $\epsilon$ have not been found through the steps as shown in the flow chart of FIG. 9, in some cases, $\Delta E$ may not become smaller than threshold $\epsilon$ even when trials are made with revised initial coordinates. In order to avoid a situation that a large number of trials have to be made, threshold β is introduced to evaluate the amount of difference for each Luv component, where this threshold is less binding than threshold ε (β>ε) but causes no problem of accuracy related to ΔE. β is a value which enables creation of an accurate LUT. Needless to say, there is an option to continue using threshold ε without introducing threshold β.

Accordingly, at step "245, the differences for the components of Luv coordinates, ΔL, Δu, Δv, are calculated from the color components of target coordinates T and those of Luv coordinates t'$_i$ (obtained by conversion). At step S250, a decision is made as to whether the differences for all these components are smaller than β. If it is decided at step S250 that the differences for all the components are smaller than β, then the final CMY coordinates are outputted to the buffer at step S260 as at the final step of the trial process shown in the flow chart of FIG. 9. In this case, the differences for the components of the CMY coordinates, ΔL, Δu, Δv, are all smaller than threshold β and the color of the CMY coordinates is satisfactorily close to the color of target coordinates T.

If it is decided at step S250 that the difference for at least one of the components is larger than β, then at step S255 the initial coordinates are revised to coordinates whose color components are all "0". At step S265, a decision is made as to whether all the components of the initial coordinates exceed the maximum tone value "255." This step is taken to prevent the revised initial coordinates from exceeding the maximum tone value in the retry process. If it is decided that all the color components of the initial coordinates exceed the maximum tone value "255," it means that the amount of difference has not become smaller than threshold β even after revision of the initial coordinates. If that is the case, the CMY coordinates with which ΔE is the smallest in the trial process are outputted to the buffer at step S290. According to the invention, even if this step (S290) is taken, an LUT can be actually made with high accuracy, as will be explained later.

If it is decided at step S265 that the difference for any component of the initial coordinates does not exceed "255," then the same procedure as that from step S205 to step S220 is carried out at step S270. In short, the trial process is done with revised initial coordinates. After that, a decision is made at step S275 as to whether count n is smaller than the prescribed number of trials N, as explained above. If it is decided that count n is smaller than N, then a decision is made at step S282 as to whether the amount of difference ΔE is smaller than the prescribed threshold ε. If it is not decided at step S282 that ΔE is smaller than ε, then the same procedure as that from step S205 to step S220 is carried out at step S270. If it is decided at step S282 that ΔE is smaller than ε, then the correlation between the CMY coordinates t$_i$ at that moment and target coordinates T is outputted to the buffer at step S286.

If it is not decided at step S275 that count n is smaller than N (number of trials), then at step 280 ΔL, Δu, Δv are calculated and a decision is made as to whether the differences for all the components are smaller than β. If it is decided at step S280 that they are all smaller than β, then the final CMY coordinates are outputted to the buffer at step S286 (final step in the trial process). If it is decided at step S280 that the difference for at least one of the components is larger than β, then a specific value Δγ is added to all the components of the initial CMY coordinates at step S284 and the procedure from step S265 is repeated. In this way, when the initial coordinates are revised, threshold β, which is less binding than threshold ε, is introduced to ensure that the correlation between CMY coordinates and target coordinates T is defined without any significant deterioration in accuracy.

Figure 11:
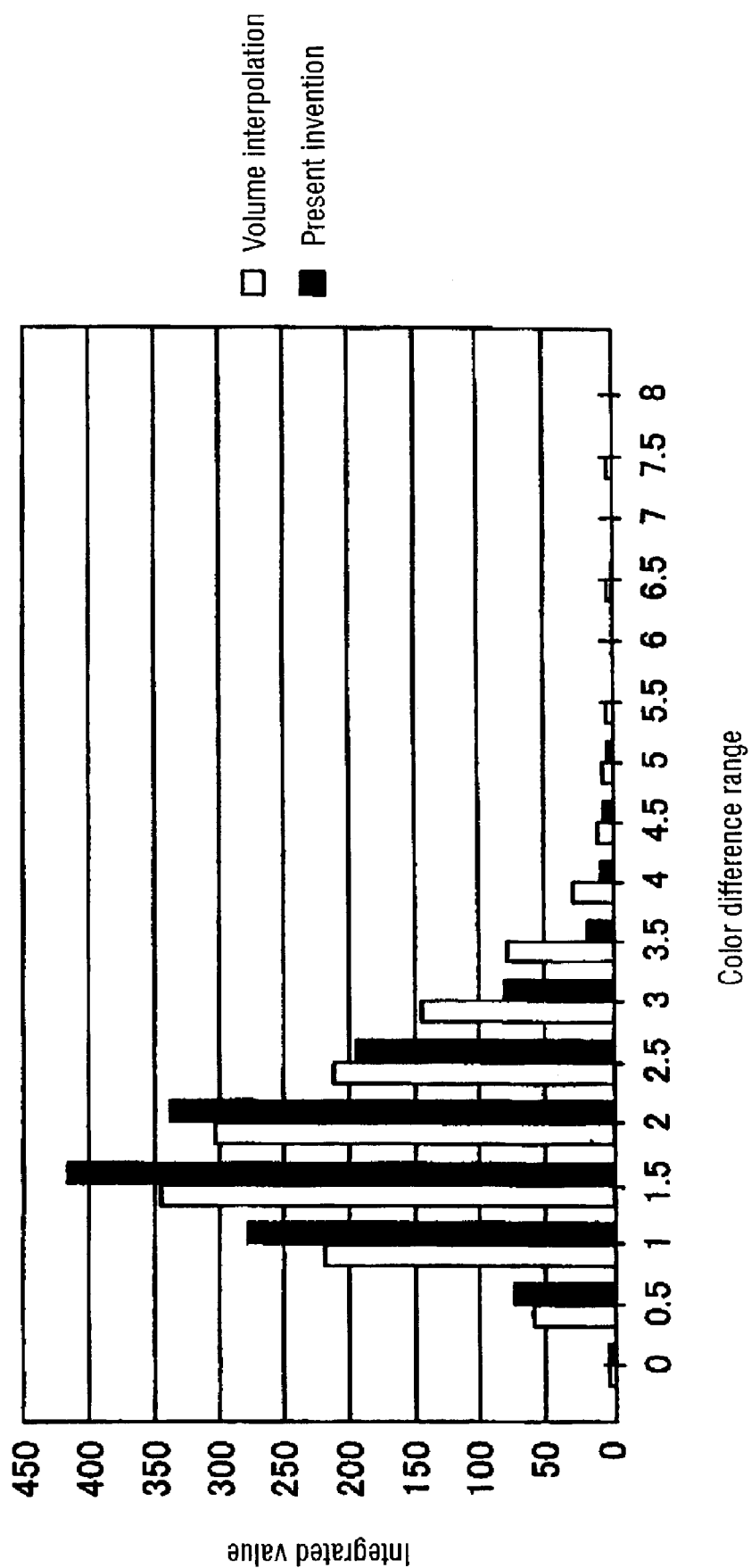
FIG. 11 is a graph indicating integrated color difference values in each color difference range.

FIG. 11 graphically shows color differences between the Luv coordinates obtained from measurement of color patches printed on the printing apparatus 12 using specific CMY coordinates as defined in the created LUT and the Luv coordinates correlated with the CMY coordinates in the LUT. In the graph, the vertical axis expresses integrated values (reference point totals) and the horizontal axis color difference ranges. For instance, at "0" on the horizontal axis, the graph shows an integrated value for a color difference range of 0-0.5; at "0.5", an integrated value for a color difference range of 0.5-1. The data in this graph has been obtained by integration of approximately 1400 reference points among $17^3$ reference points and, for the purpose of comparison, the graph also shows integrated values concerning the LUT created by the conventional volume interpolation method, on the left of the integrated values based on the invention. As observed from the graph, in the color difference range from 0 to 2.5, the integrated values for the invention are much higher than those for the volume integration method and in the color difference range of over 2.5, those for the invention are lower than those for the volume interpolation method. This demonstrates that the color difference average and dispersion tendency for the invention are smaller than those for the volume interpolation method and conversion can be made over the whole color gamut with high accuracy according to the invention.

(7) Color Conversion Based on the Data in a Formed Color Conversion Table

Figure 12:
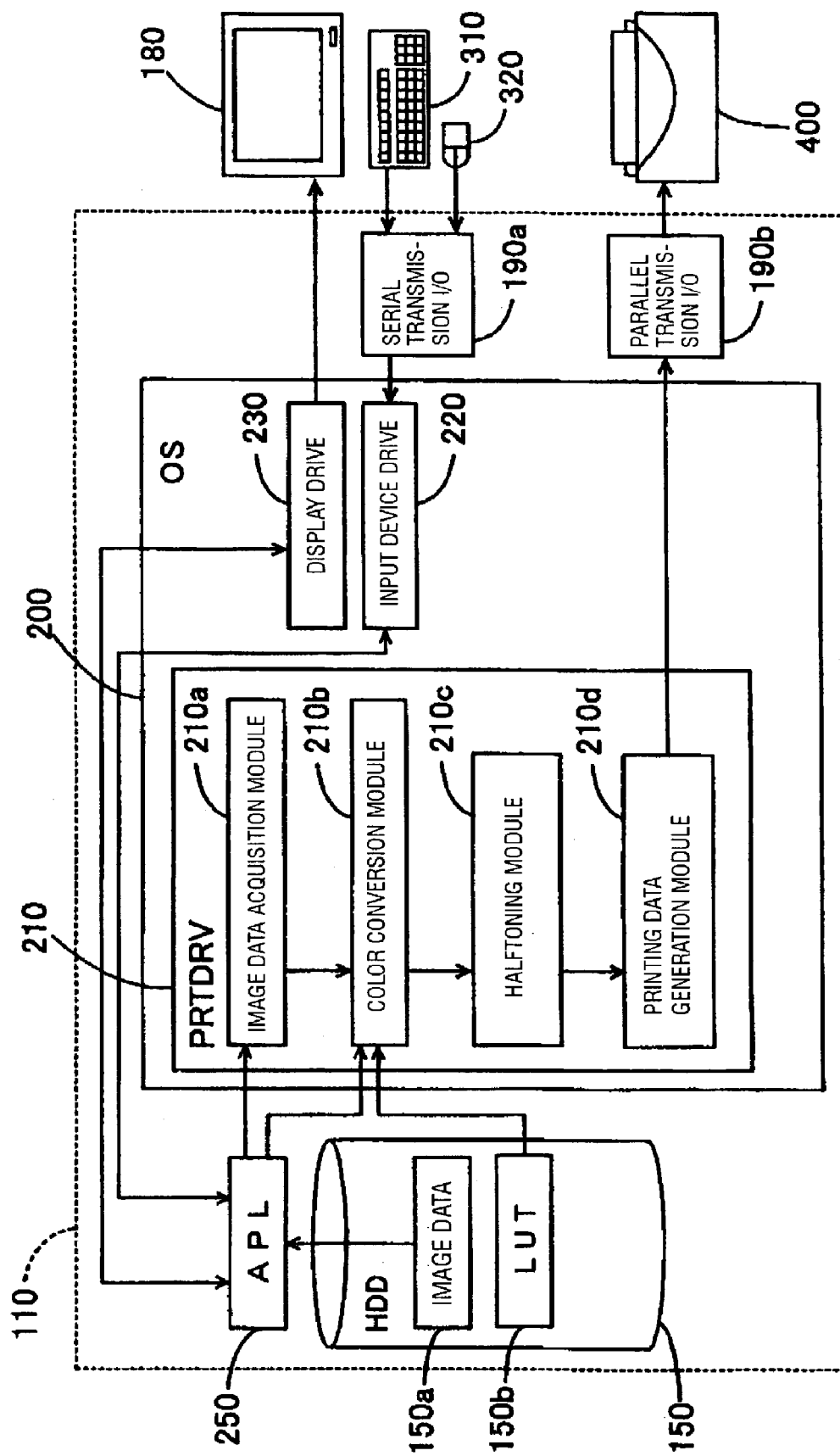
FIG. 12 is a block diagram showing a computer configuration which employs an LUT.

The LUT thus formed may be used for printing which is done on a general-purpose computer for various purposes. FIG. 12 is a block diagram showing a computer configuration which employs this type of LUT. A computer 110 is a general-purpose personal computer whose operating system 200 incorporates a printer driver (PRTDRV) 210, an input device driver (DRV) 220 and a display driver (DRV) 230. The display driver (DRV) 230 controls display of image data, etc. on a display 180 and the input device driver (DRV) 220 receives code signals from a keyboard 310 and a mouse 320 and accepts input operation done in a given manner.

APL 250 is an application program which permits retouching, etc. of color images. While APL 250 is running, the user can operate the above-said input devices to print color images on a printing apparatus 400. In printing color images, reference is made to the LUT formed according to the invention. Color image data 150a on color images created under APL 250 is dot matrix data which represents tones of RGB color components in accordance with the sRGB standard, and stored in HDD 150.

For printing, PRTDRV 210 incorporates an image data acquisition module 210a, a color conversion module 210b, a halftoning module 210c, and a printing data generation module 210d. A LUT 150b which is formed according to the invention is stored in HDD 150. As the user gives a printing instruction under APL 250, the image data 150a for printing is acquired by the image data acquisition module 210a which in turn starts the color conversion module 210b. The color conversion module 210b converts sRGB tone data into CcMmYK tone data and generates $64^3$ reference points from the $17^3$ reference points and use them to convert arbitrary sRGB dot data into CcMmYK dot data by volume interpolation.

As the color conversion module 210b generates CcMmYK tone data by color conversion, the CcMmYK tone data is sent to the halftoning module 210c. The halftoning module 210c performs halftoning by converting CcMmYK tone dot data to express them by recording ink dot densities. It generates head drive data which makes inks adhere to printing paper, etc. in accordance with the recording densities as converted tone data. The printing data generation module 210*d* receives the head drive data and rasterizes it in order to rearrange it in the order in which it is to be used on the printing apparatus 400. After the rasterization, necessary printing information such as image resolution data is added to it to generates printing data. The printing data is sent through parallel transmission I/O 190*b* to the printing apparatus 400. The printing apparatus 400 prints images as shown on the display 180 according to the printing data.

In the above printing process, color conversion takes place with reference to the LUT formed according to the invention, which implies that color conversion can be accurately made over the whole color gamut of the display 180 and that of the printing apparatus 400 and high quality printing with no tone jump can be made. The above printing process as handled by PRTDRV 210 is a standard printing process which can be applied for various purposes. Therefore, just by replacing the LUT formed by the conventional method with the LUT formed by the invention's method for forming a color conversion table, high quality printing can be achieved on most printing apparatuses without the need for modifying the hardware configuration.

(8) Other Embodiments

In order to make the color difference smaller than a desired level as a result of trials (the number of trials should be smaller than N), the above embodiments use thresholds ϵ and β. However, various alternative approaches to decreasing the difference smoothly may be used. In the above trial process, although CMY coordinates are converted into Luv coordinates using a spline interpolation function, there maybe sometimes a case that the difference cannot be decreased smoothly because multidimensional spline curves tend to become wavy.

If that is the case, the process of decreasing the difference can be often made smoother by changing the method of conversion from CMY coordinates into Luv coordinates to a simpler method. One approach is to use volume interpolation or triangular pyramid interpolation instead of spline interpolation. Even when a new simpler method is employed, a spline interpolation function may be used after the difference is decreased to a certain degree so that the correlation between CMY coordinates and Luv coordinates can be defined with high accuracy. The conversion method may be switched in various manners. One possible example is that the method of conversion by spline interpolation is basically used and, if it fails to make the difference smaller than a threshold despite trials made as many times as the prescribed maximum number, it is switched to a simpler method. Another possible example is that volume interpolation or triangular pyramid interpolation is used in the early stage of the trial process and when the difference is decreased to a certain degree, it is switched to spline interpolation.

As discussed so far, according to the invention, on condition that conversion from a second color space to a first color space can be made accurately, target coordinates are set in the first color space and coordinates are arbitrarily selected in the second color space; and the coordinates in the second color space are converted into coordinates in the first color space and the difference between the target coordinates and the coordinates obtained by the conversion is calculated; a trial to move the coordinates in the second space is repeated as many times as necessary to make the difference smaller than a prescribed threshold. Accordingly, the correlation between the first color space and second color space can be defined by high accuracy conversion processes. Highly accurate color conversion can be achieved across the color space according to the correlation data thus defined.

The foregoing invention has been described in terms of preferred embodiments. However, those skilled, in the art will recognize that many variations of such embodiments exist. Such variations are intended to be within the scope of the present invention and the appended claims.

We claim:

1. A method for forming a color conversion table including plural data which, according to the correlation between a first color space and a second color space as defined by a prescribed number of previously acquired sample data, defines the correlation between the first color space and the second color space, the method comprising:

a step of setting, in the first color space, target coordinates with respect to which the correlation is defined;

a step of setting, in the second color space, conversion object coordinates;

a step of converting the conversion object coordinates into corresponding coordinates in the first color space according to the sample data;

a step of carrying out a trial process involving the step of setting conversion object coordinates and the step of converting them so as to decrease the difference between the corresponding coordinates in the first color space as obtained by the conversion step and the target coordinates;

wherein the conversion object coordinates are provided by calculating a variation of the conversion objects coordinates and the variation of the conversion objects coordinates is calculated by multiplying partial derivatives of the components in the difference with a variation in the second color space at a minute variation of the first color space;

a step of generating color conversion table data which defines the correlation between the conversion object coordinates in the second color space and the target coordinates when the difference becomes smaller than a prescribed threshold at the trial step; and a step of storing the color conversion table data in a memory device.

2. The method for forming a color conversion table as claimed in claim 1, wherein the first color space is a uniform color space and the second color space consists of components corresponding to three colors to be used in an image device.

3. The method for forming a color conversion table as claimed in claim 1, wherein the second color space consists of components corresponding to three colors to be used in an image device, and sample data which defines the correlation between the first color space and the second color space is obtained by measuring the colors outputted by the image device with a prescribed calorimeter.

4. The method for forming a color conversion table as claimed in claim 1, wherein, at the step of setting target coordinates, coordinates in a third color space are converted into coordinates in the first color space in accordance with a prescribed formula and the resulting coordinates are treated as target coordinates.

5. The method for forming a color conversion table as claimed in claim 4, wherein the third color space consists of components corresponding to three colors to be used in an image device.

6. The method for forming a color conversion table as claimed in claim 4, wherein, at the step of setting target coordinates, target coordinates are determined by mapping the coordinates in the first color space obtained by conversion of coordinates in the third color space, in a specified area in the first color space, within the color gamut of the image device which uses the second color space.

7. The method for forming a color conversion table as claimed in claim 1, wherein, in the first trial at the step of setting target coordinates, the same initial coordinates are set for any target coordinates.

8. The method for forming a color conversion table as claimed in claim 1, wherein the first color space is almost symmetric with respect to a specific axis and, in the first trial of the step of setting target coordinates, coordinates in the vicinity of the specific axis are made the initial coordinates to be converted.

9. The method for forming a color conversion table as claimed in claim 1, wherein at the conversion step, conversion object coordinates in the second color space are converted into coordinates in the first color space using a spline interpolation function determined by the sample data.

10. The method for forming a color conversion table as claimed in claim 1, wherein at the trial step, if the difference in the first color space does not become smaller than a prescribed threshold, the trial process is once stopped after a prescribed number of trials made and the conversion method is changed and then the trial process is resumed.

11. The method for forming a color conversion table as claimed in claim 1, wherein at the trial step, if the difference in the first color space does not become smaller than a prescribed threshold, the trial process is once stopped after a prescribed number of trials made, the initial coordinates to be converted in the first trial are revised and the trial process is resumed.

12. The method for forming a color conversion table as claimed in claim 11, wherein the first color space is virtually symmetric with respect to a specific axis and at the step, after the trial process is once stopped, coordinates which are away from the initial coordinates by a given distance along the specific axis are defined as new initial coordinates and the trial process is resumed.

13. A method for forming a color conversion table including plural data which, according to the correlation between a first color space and a second color space as defined by a prescribed number of previously acquired sample data, defines the correlation between the first color space and the second color space, the method comprising:
- a step of acquiring sample data which make up a virtually cubic lattice in the second color space with the corresponding lattice points in the first color space making up a non-cube;
- a step of setting, in the first color space, target coordinates with respect to which the correlation is defined;
- a step of setting, in the second color space, conversion object coordinates;
- a step of converting the conversion object coordinates into corresponding coordinates in the first color space according to the sample data;
- a step of carrying out a trial process involving the step of setting conversion object coordinates and the step of converting them so as to decrease the difference between the corresponding coordinates in the first color space as obtained by the conversion step and the target coordinates;
- wherein the conversion object coordinates are provided by calculating a variation of the conversion objects coordinates and the variation of the conversion objects coordinates is calculated by multiplying partial derivatives of the components in the difference with a variation in the second color space at a minute variation of the first color space;
- a step of generating color conversion table data which defines the correlation between the conversion object coordinates in the second color space and the target coordinates when the difference becomes smaller than a prescribed threshold at the trial step; and
- a step of storing the color conversion table data in a memory device.

14. A method for forming a color conversion table including plural data which, according to the correlation between a first color space and a second color space as defined by a prescribed number of previously acquired sample data, defines the correlation between desired coordinates in the first color space and coordinates in the second color space,
- wherein the step of converting coordinates in the second color space into coordinates in the first color space according to the previously defined correlation can be carried out; and
- wherein coordinates in the first color space corresponding to the coordinates in the second color space are calculated by the conversion step; and components of the difference between the calculated coordinates and the coordinates in the first color space are calculated to provide partial derivatives and the partial derivatives are multiplied with a variation in the second color space at a minute variation of the first color space so as to provide next coordinates; and
- then the process of setting next coordinates in the second color space is repeated to find coordinates in the second color space which correspond to the desired coordinates in the first color space and include it in the color conversion table data, the color conversion table data being stored in a memory device.

15. A method for forming a color conversion table which generates color conversion table data where: specific CMY coordinates are given; uniform color space coordinates are obtained as data in a uniform color space such as an Luv color space by measuring color samples outputted by a printing apparatus with a colorimeter; and plural sample data which define the correlation between the CMY color space and the uniform color space using the uniform color space coordinates and the CMY coordinates are given, the color conversion table including plural data defining the correlation between the RGB color space to be used by a display and the CMY color space according to the sample data, the method comprising:
- a step of setting corresponding uniform color space coordinates by converting plural coordinates making up a virtually cubic lattice in the RGB color space in accordance with a prescribed formula;
- a step of setting initial CMY coordinates in the CMY color space;
- a step of converting the initial CMY coordinates into uniform color space coordinates by interpolation according to the correlation defined by the sample data;
- a step of calculating the difference between the uniform color space coordinates obtained by the step of converting initial CMY coordinates and the target uniform color space coordinates;
- a step of repeating a trial in which the CMY coordinates are determined so as to decrease the difference in the uniform color space and the CMY coordinates thus determined are again converted into uniform color space coordinates by interpolation as mentioned above and the difference is calculated again;

wherein the CMY coordinates are provided by calculating a variation of the CMY coordinates and the variation of the CMY coordinates is calculated by multiplying partial derivatives of the components in the difference with a variation in the difference in the uniform color space and the CMY coordinates thus determined;

a step of generating color conversion table data for converting image data expressed by the RGB color space to be used by the display, into image data expressed by a CMY color space to be used on a printing apparatus, by correlating the CMY coordinates when the difference becomes smaller than a prescribed threshold at the trial step, with the target uniform color space coordinates and correlating the RGB coordinates as the source of the target coordinates with the CMY coordinates; and a step of storing the color conversion table data in a memory device.

16. An apparatus for forming a color conversion table including plural data which, according to the correlation between a first color space and a second color space as defined by a prescribed number of previously acquired sample data, defines the correlation between the first color space and the second color space, the apparatus comprising:

a unit for setting, in the first color space, target coordinates with respect to which the correlation is defined;

a unit for setting, in the second color space, conversion object coordinates;

a unit for converting the conversion object coordinates into corresponding coordinates in the first color space according to the sample data;

trial unit for putting the unit for setting conversion object coordinates and the unit for converting them into execution so as to decrease the difference between the corresponding coordinates in the first color space as obtained by the conversion unit and the target coordinates, wherein the conversion object coordinates are provided by calculating a variation of the conversion objects coordinates and the variation of the conversion objects coordinates is calculated by multiplying partial derivatives of the components in the difference with a variation in the second color space at a minute variation of the first color space; and a unit for generating color conversion table data which defines the correlation between the conversion object coordinates in the second color space and the target coordinates when the difference becomes smaller than a prescribed threshold through the trial unit.

17. An apparatus for forming a color conversion table including plural data which, according to the correlation between a first color space and a second color space as defined by a prescribed number of previously acquired sample data, defines the correlation between the first color space and the second color space, the apparatus comprising:

a unit for acquiring sample data which make up a virtually cubic lattice in the second color space with the corresponding lattice points in the first color space making up a non-cube;

a unit for setting, in the first color space, target coordinates with respect to which the correlation is defined;

a unit for setting, in the second color space, conversion object coordinates;

a unit for converting the conversion object coordinates into corresponding coordinates in the first color space according to the sample data;

trial unit for putting the unit for setting conversion object coordinates and the unit for converting them into execution so as to decrease the difference between the corresponding coordinates in the first color space as obtained by the conversion unit and the target coordinates, wherein the conversion object coordinates are provided by calculating a variation of the conversion objects coordinates and the variation of the conversion objects coordinates is calculated by multiplying partial derivatives of the components in the difference with a variation in the second color space at a minute variation of the first color space; and generating color conversion table data which defines the correlation between the conversion object coordinates in the second color space and the target coordinates when the difference becomes smaller than a prescribed threshold through the trial unit.

18. An apparatus for forming a color conversion table which forms a color conversion table including plural data which, according to the correlation between a first color space and a second color space as defined by a prescribed number of previously acquired sample data, defines the correlation between desired coordinates in the first color space and coordinates in the second color space, wherein coordinates in the second color space can be converted into coordinates in the first color space according to the previously defined correlation, the apparatus comprising:

a unit for calculating coordinates in the first color space corresponding to the coordinates in the second color space by the above conversion process;

trial unit for calculating components of the difference between the calculated coordinates and desired coordinates in the first color space to provide partial derivatives and multiplying the partial derivatives with a variation in the second color space at a minute variation of the first color space so as to provide next coordinates and repeating the process of setting next coordinates in the second color space; and a unit for working out coordinates in the second color space which correspond to the desired coordinates in the first color space and including them in the color conversion table data.

19. An apparatus for forming a color conversion table which generates color conversion table data where: specific CMY coordinates are given; uniform color space coordinates are obtained as data in a uniform color space such as an Luv color space by measuring color samples outputted by a printing apparatus with a calorimeter; and plural sample data which define the correlation between the CMY color space and the uniform color space using the uniform color space coordinates and the CMY coordinates are given, the color conversion table including plural data defining the correlation between the RGB color space to be used by a display and the CMY color space according to the sample data, the apparatus comprising:

a unit for setting corresponding uniform color space coordinates by converting plural coordinates making up a virtually cubic lattice in the RGB color space in accordance with a prescribed formula;

a unit for setting initial CMY coordinates in the CMY color space;

a unit for converting the initial CMY coordinates into uniform color space coordinates by interpolation according to the correlation defined by the sample data;

a unit for calculating the difference between the uniform color space coordinates obtained by the unit for converting initial CMY coordinates and the target uniform color space coordinates;

a unit for repeating a trial in which the CMY coordinates are determined so as to decrease the difference in the uniform color space and the CMY coordinates thus determined are again converted into uniform color space coordinates by interpolation as mentioned above and the difference is calculated again;

wherein the CMY coordinates are provided by calculating a variation of the CMY coordinates and the variation of the CMY coordinates is calculated by multiplying partial derivatives of the components in the difference with a variation in the difference in the uniform color space and the CMY coordinates thus determined; and a unit for generating color conversion table data for converting image data expressed by the RGB color space to be used by the display, into image data expressed by a CMY color space to be used on a printing apparatus, by correlating CMY coordinates when the difference becomes smaller than a prescribed threshold through the trial unit, with the target uniform color space coordinates and correlating the RGB coordinates as the source of the target coordinates with the CMY coordinates.

20. A printing apparatus comprising:

image data acquisition unit for acquiring image data which expresses colors of pixels in a dot matrix by coordinate values in a third color space;

color conversion unit for converting the image data into coordinates in a second color space referring to first color conversion table data stored in a prescribed recording medium;

printing data generation unit for generating printing data which specifies the recording density of ink to be ejected according to image data after the color conversion; and head drive control unit for receiving the printing data through a prescribed interface and driving printing according to the printing data, the first color conversion table data being generated by:

a step of previously acquiring a prescribed number of sample data which defines the correlation between a first color space and a second color space;

a step of setting target coordinates in a first color space by converting coordinates in a third color space into coordinates in a first color space in accordance with a prescribed formula;

a step of setting conversion object coordinates in the second color space;

a step of converting the conversion object coordinates into corresponding coordinates in a first color space according to the sample data;

a step of repeating the step of setting conversion object coordinates and the conversion step so as to decrease the difference between the corresponding coordinates in the first color space obtained by the conversion step and the target coordinates;

wherein the conversion object coordinates are provided by calculating a variation of the conversion objects coordinates and the variation of the conversion objects coordinates is calculated by multiplying partial derivatives of the components in the difference with a variation in the second color space at a minute variation of the first color space:

a step of generating second color conversion table data by correlating the conversion object coordinates in the second color space with the target coordinates when the difference becomes smaller than a prescribed threshold at the trial step; and a step of generating first color conversion table data by correlating the coordinates in the third color space as the source of the target coordinates in the first color space defined by the second color conversion table, with the coordinates in the second color space defined by the second color conversion table.

21. A printing apparatus comprising:

image data acquisition unit for acquiring image data which expresses colors of pixels in a dot matrix by coordinate values in a third color space;

color conversion unit for converting the image data into coordinates in a second color space referring to first color conversion table data stored in a prescribed recording medium;

printing data generation unit for generating printing data which specifies the recording density of ink to be ejected according to image data after the color conversion; and head drive control unit for receiving the printing data through a prescribed interface and driving printing according to the printing data, the first color conversion table data being generated by:

a step of previously acquiring a prescribed number of sample data which defines the correlation between these color spaces, with lattice points making up a virtually cubic lattice in a second color space and corresponding lattice points in a first color space making up a non-cubic lattice;

a step of setting target coordinates in a first color space by converting coordinates in a third color space into coordinates in a first color space in accordance with a prescribed formula;

a step of setting conversion object coordinates in the second color space (step of setting conversion object coordinates);

a step of converting the conversion object coordinates into corresponding coordinates in a first color space according to the sample data;

a step of repeating the step of setting conversion object coordinates and the conversion step so as to decrease the difference between the corresponding coordinates in the first color space obtained by the conversion step and the target coordinates;

wherein the conversion object coordinates are provided by calculating a variation of the conversion objects coordinates and the variation of the conversion objects coordinates is calculated by multiplying partial derivatives of the components in the difference with a variation in the second color space at a minute variation of the first color space:

a step of generating second color conversion table data by correlating the conversion object coordinates in the second color space with the target coordinates when the difference becomes smaller than a prescribed threshold at the trial step; and a step of generating first color conversion table data by correlating the coordinates in the third color space as the source of the target coordinates in the first color space defined by the second color conversion table, with the coordinates in the second color space defined by the second color conversion table.

22. A printing apparatus comprising:

a unit for acquiring image data which expresses colors of pixels in a dot matrix by coordinate values in a third color space;

a unit for conferring the image data into coordinates in a second color space referring to first color conversion table data stored in a prescribed recording medium;

a unit for generating printing data which specifies the recording density of ink to be ejected according to image data after the color conversion; and head drive control unit for receiving the printing data through a prescribed interface and driving printing according to the printing data, the first color conversion table data being generated by:

a step of previously acquiring a prescribed number of sample data which defines the correlation between a first color space and a second color space;

a step of converting coordinates in the second color space into coordinates in a first color space according to the correlation defined by the sample data;

a step of generating second color conversion table data by calculating coordinates in the first color space corresponding to the coordinates in the second color space by the conversion step, repeating the process of calculating components of the difference between the calculated coordinates and desired coordinates in the first color space to provide partial derivatives and multiplying the partial derivatives with a variation in the second color space at a minute variation of the first color space to set next coordinates in the second color space, and calculating coordinates in the second color space corresponding to the desired coordinates in the first color space; and a step of generating first color conversion table data by converting target coordinates in the first color space as defined by the second color conversion table into coordinates in the third color space in accordance with a prescribed formula and correlating the coordinates in the third color space as obtained by the conversion with the coordinates in the second color space as defined by the second color conversion table.

23. A printing apparatus comprising:

a unit for acquiring image data which expresses colors of pixels in a dot matrix by coordinates in an RGB color space to be used by a display;

a unit for converting the image data which expresses colors by coordinates in the RGB color space, into image data which expresses colors by coordinates in a CMY color space to be used by a printing apparatus, referring to color conversion table data stored in a prescribed recording medium;

a unit for generating printing data which specifies the recording density of ink to be ejected according to image data after the color conversion; and head drive control unit for receiving the printing data through a prescribed interface and driving printing according to the printing data, the color conversion table data being generated by:

a step of acquiring plural sample data which define the correlation between a CMY color space and a uniform color space, with specific CMY coordinates being given, using uniform color space coordinates obtained as data in a uniform color space such as an Luv color space and the CMY coordinates by measuring color samples outputted by a printing apparatus with a calorimeter;

a step of setting corresponding uniform color space coordinates by converting plural coordinates making up a virtually cubic lattice in the RGB color space in accordance with a prescribed formula;

a step of setting initial CMY coordinates in the CMY color space;

a step of converting the initial CMY coordinates into uniform color space coordinates by interpolation according to the correlation defined by the sample data;

a step of calculating the difference between the uniform color space coordinates obtained by the step of convening initial CMY coordinates and the target uniform color space coordinates a step of repeating a trial in which the CMY coordinates are determined so as to decrease the difference in the uniform color space and the CMY coordinates thus determined are again convened into uniform color space coordinates by interpolation as mentioned above and the difference is calculated again;

wherein the CMY coordinates are provided by calculating a variation of the CMY coordinates and the variation of the CMY coordinates is calculated by multiplying partial derivatives of the components in the difference with a variation in the difference in the uniform color space and the CMY coordinates thus determined; and a step of generating color conversion table data by correlating CMY coordinates when the difference becomes smaller than a prescribed threshold at the trial step, with the target uniform color space coordinates and correlating the RGB coordinates as the source of the target coordinates with the CMY coordinates.

* * * * *